(12) United States Patent
Bondarenko et al.

(10) Patent No.: US 12,541,457 B2
(45) Date of Patent: Feb. 3, 2026

(54) TECHNIQUE FOR HANDLING PREFETCHING USING TRIGGER CIRCUITRY

(71) Applicant: Arm Limited, Cambridge (GB)

(72) Inventors: Natalya Bondarenko, Antibes (FR); Stefano Ghiggini, Antibes (FR); Luca Nassi, Antibes (FR); Kamil Garifullin, Nice (FR)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 18/524,065

(22) Filed: Nov. 30, 2023

(65) Prior Publication Data

US 2025/0181508 A1 Jun. 5, 2025

(51) Int. Cl.
*G06F 12/0862* (2016.01)
*G06F 12/0811* (2016.01)

(52) U.S. Cl.
CPC ...... *G06F 12/0862* (2013.01); *G06F 12/0811* (2013.01)

(58) Field of Classification Search
CPC ............. G06F 12/0862; G06F 12/0811; G06F 12/0897
See application file for complete search history.

(56) References Cited

U.S. PATENT DOCUMENTS

| | | | | |
|---|---|---|---|---|
| 2014/0201452 A1* | 7/2014 | Meredith | ............. | G06F 12/127 711/130 |
| 2019/0042494 A1* | 2/2019 | Pelt | ..................... | G06F 13/1668 |
| 2020/0125492 A1* | 4/2020 | Bondarenko | ........... | G06F 12/12 |
| 2021/0182214 A1* | 6/2021 | Moyer | ................... | G06F 12/122 |
| 2021/0390053 A1* | 12/2021 | Roberts | ............... | G06F 9/30047 |

* cited by examiner

*Primary Examiner* — Sanjiv Shah
(74) *Attorney, Agent, or Firm* — NIXON & VANDERHYE P.C.

(57) ABSTRACT

An apparatus has cache circuitry providing a cache storage to store data for access by processing circuitry, and request handling circuitry arranged to process requests, each request providing an address indication for associated data. The request handling circuitry determines with reference to the address indication whether the associated data is available in the cache circuitry. The cache circuitry forms a given level of a multi-level memory hierarchy, and the request handling circuitry is responsive to determining that the associated data is unavailable in the cache circuitry to issue an onward request to cause the associated data to be retrieved into the cache circuitry from a lower level of the multi-level memory hierarchy than the given level. Prefetch circuitry issues, as one type of request to be handled by the request handling circuitry, prefetch requests, and the request handling circuitry is arranged in response to a given prefetch request to retrieve into the cache circuitry the associated data in anticipation of that associated data being requested by the processing circuitry. In addition, trigger circuitry, responsive to a specified condition being detected in respect of the given prefetch request, issues a prefetch trigger signal for receipt by control circuitry associated with further cache circuitry at a higher level of the multi-level memory hierarchy, to cause a higher level prefetch procedure to be triggered by the control circuitry to retrieve the associated data from the cache circuitry into the further cache circuitry.

20 Claims, 11 Drawing Sheets

TECHNIQUE FOR HANDLING PREFETCHING USING TRIGGER CIRCUITRY

BACKGROUND

The present technique relates to the field of data processing. More particularly, the present technique relates to the handling of prefetching of data into one or more levels of cache within a data processing system. The data being prefetched may in one example implementation be data values manipulated by processing circuitry within the data processing system, but could alternatively, or in addition, take the form of instruction data defining instructions to be executed by the processing circuitry.

A data processing system may implement a multi-level memory hierarchy that can comprise multiple levels of cache for storing data for access by the processing circuitry. The processing circuitry may issue a request seeking to access data from a cache at a given level in the memory hierarchy, and in the event of the data not being present within that cache the request can then be propagated on to a cache at a lower level in the memory hierarchy. It will typically be faster and more energy efficient to access caches at higher levels in the memory hierarchy, and as one progresses through lower levels in the memory hierarchy, the caches tend to become larger to enable more data to be stored, but as a result can be slower to access and may consume more power.

Prefetch circuitry may be provided in association with one or more caches to monitor accesses made to data in order to seek to identify patterns in those accesses and hence estimate data that is likely to be the subject of future access requests by the processing circuitry. The prefetch circuitry can then seek to prefetch certain data into the associated cache so that if the processing circuitry does indeed request that data it is likely to already be in the cache. Given that caches tend to be larger and more complex at lower levels of the memory hierarchy, larger and more complex prefetch circuits can more readily be accommodated in association with such caches. It has been observed that in some instances prefetch circuitry associated with a given cache at a given level in the multi-level memory hierarchy may be able to reliably predict certain data to be prefetched whilst prefetch circuitry associated with a further cache at a higher level in the multi-level memory hierarchy (if indeed prefetch circuitry is provided in association with that further cache) may not be able to predict the need for that data, and hence that data will not be prefetched into the further cache. In such instances, the presence of the prefetched data within the given cache can give rise to performance improvements (relative to a situation where the request would miss within that cache, and hence would need to be propagated on to a lower level of cache and/or main memory), but even more of a performance improvement could have been achieved were that data to have been present within the further cache.

SUMMARY

In accordance with a first example arrangement there is provided an apparatus comprising: cache circuitry providing a cache storage to store data for access by processing circuitry; request handling circuitry associated with the cache circuitry and arranged to process requests received by the request handling circuitry, each request providing an address indication for associated data and the request handling circuitry being arranged to determine with reference to the address indication whether the associated data is available in the cache circuitry; wherein the cache circuitry is arranged to form a given level of a multi-level memory hierarchy, and the request handling circuitry is responsive to determining that the associated data is unavailable in the cache circuitry to issue an onward request to cause the associated data to be retrieved into the cache circuitry from a lower level of the multi-level memory hierarchy than the given level; prefetch circuitry to issue, as one type of request to be handled by the request handling circuitry, prefetch requests, and the request handling circuitry being arranged in response to a given prefetch request to retrieve into the cache circuitry the associated data in anticipation of that associated data being requested by the processing circuitry; and trigger circuitry, responsive to a specified condition being detected in respect of the given prefetch request, to issue a prefetch trigger signal for receipt by control circuitry associated with further cache circuitry at a higher level of the multi-level memory hierarchy, to cause a higher level prefetch procedure to be triggered by the control circuitry to retrieve the associated data from the cache circuitry into the further cache circuitry.

In accordance with a second example arrangement, there is provided an apparatus comprising: further cache circuitry arranged to form a higher level of a multi-level memory hierarchy than cache circuitry at a lower level of the multi-level memory hierarchy, the further cache circuitry providing a cache storage to store data for access by processing circuitry; and control circuitry, responsive to a prefetch trigger signal received from trigger circuitry associated with the cache circuitry at the lower level of the multi-level memory hierarchy, to cause a request to be asserted for the further cache circuitry providing an address indication identified by the prefetch trigger signal, the request causing associated data identified by the address indication to be retrieved into the further cache circuitry from the cache circuitry, that associated data having been retrieved into the cache circuitry by prefetching activity performed at the lower level of the multi-level memory hierarchy for the cache circuitry.

In accordance with a further example arrangement, there is provided a system comprising: an apparatus in accordance with either or both of the first and second example arrangements, implemented in at least one packaged chip; at least one system component; and a board, wherein the at least one packaged chip and the at least one system component are assembled on the board. In a still further example arrangement, there is provided a chip-containing product comprising the system of the above example arrangement assembled on a further board with at least one other product component.

In a yet further example arrangement, there is provided a computer-readable medium to store computer-readable code for fabrication of an apparatus in accordance with the first and/or second example arrangements discussed above. The computer-readable medium may be a transitory computer-readable medium or a non-transitory computer-readable medium.

In another example arrangement, there is provided a method of handling prefetching in an apparatus having cache circuitry providing a cache storage to store data for access by processing circuitry, the cache circuitry forming a given level of a multi-level memory hierarchy, and the method comprising: employing request handling circuitry associated with the cache circuitry to process requests received by the request handling circuitry, each request providing an address indication for associated data and the request handling circuitry determining with reference to the address indication whether the associated data is available in the cache circuitry; issuing, in response to determining that the associated data is unavailable in the cache circuitry, an onward request to cause the associated data to be retrieved into the cache circuitry from a lower level of the multi-level memory hierarchy than the given level; employing prefetch circuitry to issue, as one type of request to be handled by the request handling circuitry, prefetch requests; in response to a given prefetch request, retrieving into the cache circuitry the associated data in anticipation of that associated data being requested by the processing circuitry; and responsive to a specified condition being detected in respect of the given prefetch request, issuing a prefetch trigger signal for receipt by control circuitry associated with further cache circuitry at a higher level of the multi-level memory hierarchy, to cause a higher level prefetch procedure to be triggered by the control circuitry to retrieve the associated data from the cache circuitry into the further cache circuitry.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLES

Figure 1:
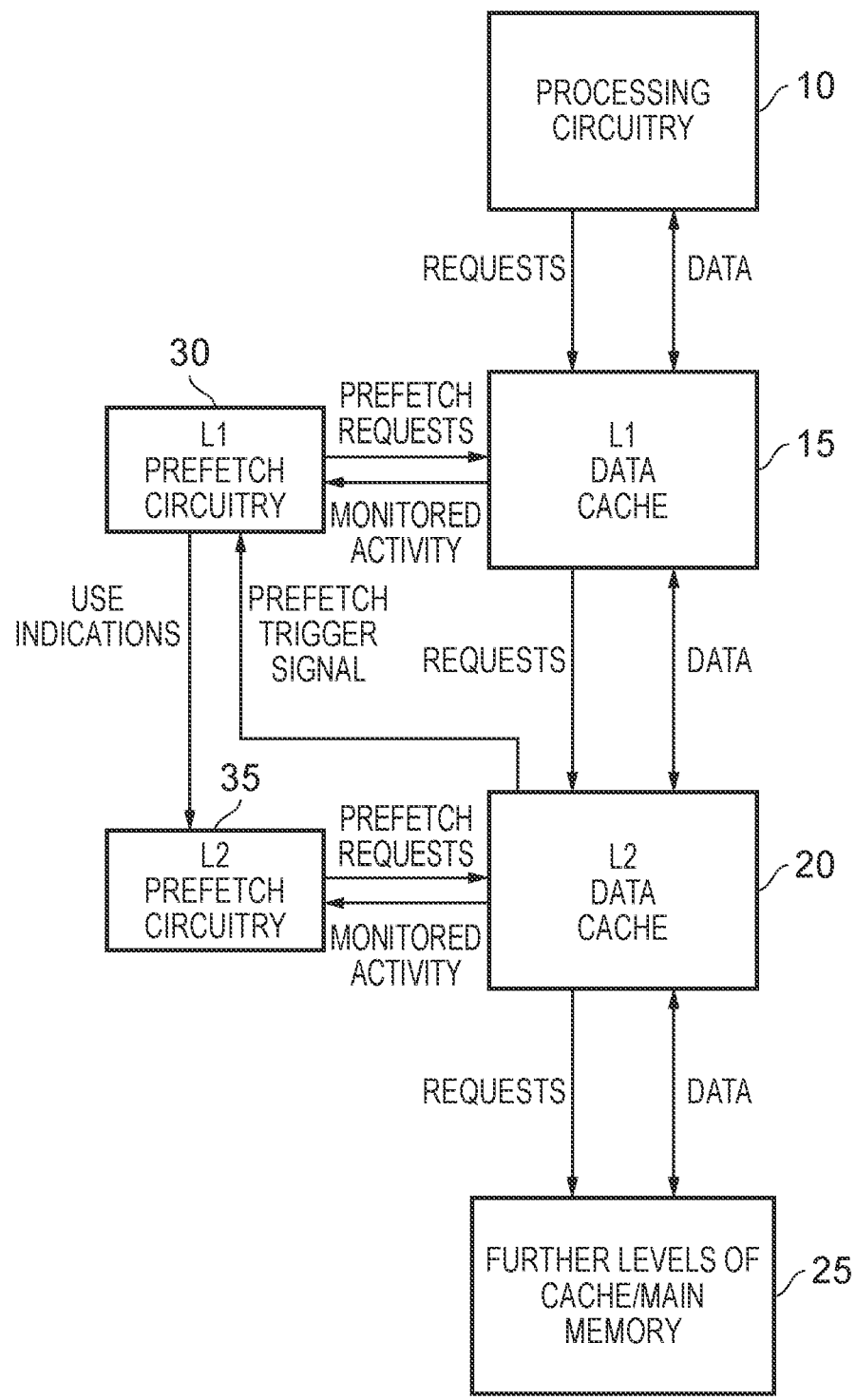
FIG. 1 is a block diagram illustrating a data processing system in accordance with one example implementation.

In accordance with one example implementation an apparatus has cache circuitry that provides a cache storage to store data for access by processing circuitry. The processing circuitry can take a variety of forms, for example a central processing unit (CPU), a processing element within a multithreaded processor, a graphics processing unit (GPU), etc. The cache circuitry can also take a variety of forms. For instance, in addition to the cache storage it may also provide other associated storage components, for example a buffer storage (also referred to herein as a transaction queue) whose buffer entries can be used to track outstanding requests, such as a request that has resulted in a cache miss within the cache storage, and for which the required data is hence being retrieved from a lower level of cache and/or main memory.

The apparatus further has request handling circuitry associated with the cache circuitry, that is arranged to process requests received by the request handling circuitry. Each request provides an address indication for associated data and the request handling circuitry is arranged to determine with reference to the address indication whether the associated data is available in the cache circuitry. The address indication can take a variety of forms. For example, it may take the form of a virtual address or a physical address, and when it takes the form of a virtual address an address translation may be performed in order to convert the virtual address into a physical address, for example if the physical address information is needed in order to perform a lookup operation within the cache circuitry.

The cache circuitry is arranged to form a given level of a multi-level memory hierarchy and the request handling circuitry is responsive to determining that the associated data is unavailable in the cache circuitry to issue an onward request to cause the associated data to be retrieved into the cache circuitry from a lower level of the multi-level memory hierarchy than the given level. The lower level of the multi-level memory hierarchy could for example be another level of cache, or main memory, depending on which level of the multi-level memory hierarchy the above-mentioned cache circuitry is associated with.

The apparatus further provides prefetch circuitry to issue, as one type of request to be handled by the request handling circuitry, prefetch requests. The request handling circuitry is arranged in response to a given prefetch request to retrieve into the cache circuitry the associated data in anticipation of that associated data being requested by the processing circuitry. The prefetch circuitry can be arranged in a variety of ways, but typically is arranged to monitor the accesses made to the cache circuitry in order to seek to detect patterns of accesses. Based on that information, a prediction can then be made by the prefetch circuitry as to data that may in due course be requested by the processing circuitry, and prefetch requests can be issued in order to seek to prefetch into the cache circuitry such data, with the aim that if in fact a request is in due course issued by the processing circuitry to access that data a hit will be detected in the cache circuitry, hence improving performance by avoiding the need to propagate that request on to lower levels of cache and/or main memory.

In accordance with the techniques described herein, it is envisaged that there is at least one higher level of cache than the above-mentioned cache circuitry in the memory hierarchy. As discussed earlier, larger and more complex prefetch circuits can more readily be accommodated in association with caches that are at lower levels in the memory hierarchy. Hence, it is possible that the above-mentioned prefetch circuitry provided in association with the above-mentioned cache circuitry may be able to reliably detect certain accesses that are likely to be made by the processing circuitry whilst any prefetch circuitry provided in association with a higher level of cache may not be able to do so.

Whilst this is not problematic per se, in that such data may be prefetched into the cache circuitry, and hence a hit may be detected when a request issued for that data by the processing circuitry is processed by the above-mentioned request handling circuitry, it does mean that a miss will have first been detected in the higher level of cache, and hence the potential performance benefits of hitting in the higher level cache will not in that instance have been realised.

However, due to the size and complexity constraints typically placed on such a higher level of cache, it is often not practical to seek to provide more complex prefetch circuitry in association with the higher level of cache. It would be desirable to increase the likelihood of a hit being detected in the higher level cache without needing to increase the size and complexity of any prefetch circuitry provided in association with that higher level of cache.

In accordance with the techniques described herein, the apparatus further has trigger circuitry that, when a specified condition is detected in respect of a given prefetch request, is arranged to issue a prefetch trigger signal for receipt by control circuitry associated with further cache circuitry at a higher level of the multi-level memory hierarchy. This prefetch trigger signal causes a higher level prefetch procedure to be triggered by the control circuitry in order to retrieve the associated data from the cache circuitry into the further cache circuitry. Hence, by such an approach, for a given prefetch request that causes data to be prefetched into a given lower level cache of the memory hierarchy, then if a specified condition is detected in respect of that prefetch request the trigger circuitry can issue a prefetch trigger signal that effectively causes a higher level cache to make a prefetch request for that data, thereby promoting that data into the higher level cache. Also, since that data will have been prefetched into the lower level cache, it will be readily available to provide to the higher level cache in response to that prefetch request. This promotion of the data into the higher level cache is achieved without needing to increase the complexity of any prefetch circuitry associated with the higher level cache, and indeed the technique can operate even if there is no dedicated prefetch circuitry associated with the higher level cache.

By use of the above described technique, performance of a data processing system can be significantly improved, by enabling at least some of the data that is identified for prefetching at a certain cache level to be promoted into a higher cache level without needing any prefetching circuitry associated with that higher cache level to independently identify that data for prefetching.

The higher level prefetch procedure can take a variety of forms, depending on the circuitry provided in association with the higher level cache. In one example, the control circuitry may respond to the prefetch trigger signal by causing a linefill request to be issued from the higher level cache for the data to which the prefetch trigger signal relates. For instance the prefetch trigger signal may provide an address indication for the data in question, and that address indication can be used when issuing the linefill request to identify the address of the data that is being requested. In implementations where the higher level cache also has associated prefetch circuitry (which may be referred to herein as further prefetch circuitry associated with the further cache circuitry) then the prefetch trigger signal can be issued for receipt by that further prefetch circuitry (which in this example can be considered to form at least part of the above-mentioned control circuitry). The prefetch trigger signal may be arranged to cause that further prefetch circuitry to issue a prefetch request to request handling circuitry associated with the higher level cache, which in turn will result in the issuance of a linefill request from the higher level cache to the request handling circuitry for the above-mentioned cache circuitry of the lower level cache. Since the data in question will have been prefetched into that lower level cache circuitry, the request handling circuitry can readily respond to the linefill request by providing the requested data.

The trigger circuitry can be located at a variety of places within the apparatus, dependent on implementation. However, in one example implementation it may be considered to form part of the request handling circuitry, and can monitor prefetch requests being handled by the request handling circuitry in order to determine whether, for any given such prefetch request, the prefetch trigger signal should be issued.

The timing of issuance of the prefetch trigger signal by the trigger circuitry may vary dependent on implementation. However, in one example implementation the request handling circuitry is arranged, in response to the given prefetch request, to initiate retrieval of the associated data into the cache circuitry prior to the trigger circuitry issuing the prefetch trigger signal. Hence, in such an implementation steps will have been taken to initiate the process of retrieving the data into the (lower level) cache circuitry before sending the prefetch trigger signal to the control circuitry associated with the further (higher level) cache circuitry. This hence increases the likelihood that the data will be ready to be provided to the higher level cache circuitry when in due course a request is made for that data in response to the prefetch trigger signal. This can be beneficial, since often the higher level cache will only be able to handle a relatively small number of pending access requests seeking data from the lower level cache, and hence it would be desirable for the request issued from the higher level cache as a result of the prefetch trigger signal to be able to be serviced relatively quickly by the lower level cache, which is more likely to be the case if that lower level cache has already undertaken steps to retrieve the data.

It should be noted that the data may be retrieved into different components of the cache circuitry, dependent on implementation. For example, the data may be retrieved directly into the cache storage, but in one example implementation it is retrieved into buffer storage within the cache circuitry, from where it can later be drained into the cache storage.

In one example implementation, the trigger circuitry is arranged to control timing of issuance of the prefetch trigger signal so that the associated data for the given prefetch request will be present in the cache circuitry by the time performance of the higher level prefetch procedure is seeking to retrieve the associated data from the (lower level) cache circuitry into the (higher level) further cache circuitry. In one example implementation this may be achieved by waiting until the associated data for the given prefetch request has been retrieved into the cache circuitry before the prefetch trigger signal is issued. However, in some implementations, it may be decided to issue the prefetch trigger signal at a slightly earlier time, for example based on knowledge of the latency between the prefetch trigger signal being issued and the earlier-mentioned higher level prefetch procedure being performed, whilst still having an expectation that the data will have been retrieved into the lower level cache by the time the higher level cache is seeking to retrieve the data in response to the prefetch trigger signal.

As mentioned earlier, in one example implementation the cache circuitry may comprise buffer storage into which data retrieved from a lower level of the multi-level memory hierarchy is buffered prior to being drained from the buffer storage into the cache storage. In such an implementation, the trigger circuitry may be arranged to control the timing of issuance of the prefetch trigger signal such that the associated data for the given prefetch request will be present in the buffer storage by the time performance of the higher level prefetch procedure is seeking to retrieve the associated data from the cache circuitry into the further cache circuitry.

In one example implementation, the buffer storage comprises a plurality of buffer entries, where each buffer entry is arranged to store an address indication, an indication of a type of request that provided that address indication, and the associated data when retrieved from the lower level of the multi-level memory hierarchy. The buffer storage may be arranged to allocate a given buffer entry to store the address indication provided by the given prefetch request. The trigger circuitry may then be arranged to issue the prefetch trigger signal in response to the associated data being retrieved from the lower level of the multi-level memory hierarchy into the given buffer entry provided the specified condition is determined to be present for the given prefetch request. As with the earlier discussion, the exact time at which the prefetch trigger signal is issued may be varied dependent on implementation. For example, it may in one example implementation only be issued once the associated data has all been retrieved into the given buffer entry, but in another example implementation the prefetch trigger signal may be issued slightly earlier, for example at some point after that data has been requested, or has started to be received into the buffer entry.

The point in time at which it is determined whether the specified condition is present or absent may be varied dependent on implementation. In one example implementation, this evaluation is performed at the point in time where it is desired to issue the prefetch trigger signal. Hence, in one particular example implementation, the assessment as to whether the specified condition is present or absent may be taken once the data has been retrieved into the buffer entry. However, in an alternative implementation the evaluation could be performed at an earlier point in time, for example at the time a buffer entry is allocated for the prefetch request, and then a monitoring process could track whether anything changes between the time the evaluation is performed and the prefetch trigger signal is to be issued that would indicate that the specified condition is no longer present.

In one example implementation, in response to the higher level prefetch procedure causing the associated data for the given prefetch request to be transferred from the buffer storage to the further cache circuitry, the request handling circuitry is arranged to prevent the associated data being drained into the cache storage. Such an approach can free up space in the cache storage, as there is no need to store the data in the cache storage as it is known that the higher level cache now has the data. Such an approach can be beneficial when the (lower level) cache circuitry and the (higher level) further cache circuitry are operated as exclusive caches, since it can improve efficiency. However, it can also be beneficial when used in association with other cache arrangements. For instance, if the caches are operated as inclusive caches, then whilst it would still be necessary to allocate a cache line in the lower level cache with a flag set to indicate that the data is already allocated in the higher level cache in order to obey the inclusivity requirements, it may only be necessary to allocate that cache line in the lower level cache for maintenance purposes, and there may be no need to store the data per se in the lower level cache given that it is already known that that data is in the higher level cache (hence avoiding the time and power consumption associated with draining the data from the buffer entry into the cache storage of the lower level cache). In such a case, that cache line could be given the lowest priority for cache access within the lower level cache, allowing other requestors to potentially access the lower level cache earlier.

The specified condition used to determine whether a prefetch trigger signal is issued in respect of the given prefetch request can take a variety of forms, dependent on implementation. For instance, in some cases it may be considered appropriate to allow a prefetch trigger signal to be issued for most, if not all, prefetch requests. However, in one example implementation it is desirable to only issue prefetch trigger signals in association with prefetch requests that there is a threshold level of confidence associated with. In one example implementation, the prefetch circuitry may be arranged to maintain accuracy information for one or more prefetch requests issued by the prefetch circuitry, the accuracy information being indicative of a likelihood that the associated data will in due course be requested by the processing circuitry. In such an implementation, detection of the specified condition for the given prefetch request may require the accuracy information for that given prefetch request to indicate an accuracy above a threshold accuracy level. It should be noted that this may not be the only factor that is considered when determining whether the specified condition is present or not. For instance, as will be discussed in more detail later, there may be other factors that influence whether the specified condition is determined to be present, even if the accuracy exceeds the above-mentioned threshold accuracy level.

When data is promoted from the lower level cache to the higher level cache as a result of the above described process, this could potentially affect the accuracy of the above-mentioned accuracy information, and indeed more generally could affect the accuracy of the training procedures used by the prefetch circuitry to determine what data to prefetch into the lower level cache, since access requests issued by the processing circuitry relating to data prefetched into the lower level cache may then hit within the higher level cache without any request being propagated on to the lower level cache. To alleviate this issue, in one example implementation the apparatus further comprises an input interface to receive an indication of use by the processing circuitry of the data stored in the further cache circuitry as a result of the higher level prefetch procedure, and the prefetch circuitry is arranged to update the accuracy information for the given prefetch request in dependence on the indication of use received at the input interface. This indication of use information can also be used to update the training within the prefetch circuitry, for example to indicate to the prefetch circuitry which prefetched cache lines have been promoted into the higher level cache by virtue of the above-mentioned procedures.

The form of the indication of use information received via the input interface could take a variety of forms, but in one example implementation takes the form of hit information for the relevant data as stored in the higher level cache, hence being indicative of how much use the processing circuitry has made of that data.

In one example implementation, the trigger circuitry may be arranged, in the presence of one or more inhibiting conditions, to determine that the specified condition is absent for the given prefetch request despite the accuracy information for that given prefetch request indicating an accuracy above a threshold accuracy level. In particular, there can be a variety of situations where it is desirable not to trigger a prefetch into the higher level cache. For example, whilst the data is being prefetched into the lower level cache, a demand access request may be received by the lower level cache relating to data forming at least part of the associated data for the prefetch request. In that case, the data will end up being stored in the higher level cache as a result of the demand access request, and hence there is no need to issue the prefetch trigger signal. Indeed, the issuing of such a prefetch trigger signal could reduce efficiency by initiating a series of steps within the higher level cache that are not needed. As another example, write streaming mode may be supported in association with one or more cache levels. If write streaming mode is being used in association with the higher level cache, then write access requests received by that cache still result in a lookup in the cache, but if they miss then the data is written out to the lower level cache rather than starting a linefill into that higher level cache. In such situations, it would not be desirable to seek to trigger prefetches into the higher level cache, and so that behaviour can be inhibited when write streaming mode is present.

In one example implementation, the trigger circuitry may be arranged to suppress generation of the prefetch trigger signal when one or more conditions are detected in relation to at least one of the cache circuitry and the further cache circuitry. For example, if it is detected that in either or both of the lower level cache and the higher level cache there are insufficient resources to deal with the additional request that would be generated as a result of issuing the prefetch trigger signal, then it may be decided not to issue the prefetch trigger signal in that instance.

Other examples of situations where generation of the prefetch trigger signal may be suppressed may include at least one of: a hit rate in the further cache circuitry exceeding a given hit threshold (this indicating for example that the further cache circuitry is operating very effectively, and hence additional prefetching may not be beneficial); linefill buffer circuitry used to hold information relating to pending linefill requests issued to retrieve data into the further cache circuitry having an occupancy above a given occupancy threshold (hence indicating that there may be insufficient resources in the further cache circuitry to cope with additional prefetching); and/or the further cache circuitry operating in a mode of operation where prefetching is to be inhibited (one example of this situation could be where the further cache circuitry is operating in write streaming mode as noted above, but there may be other modes of operation where it is also appropriate to inhibit prefetching).

In one example implementation, requests may specify virtual addresses and the apparatus may have address translation circuitry to convert a specified virtual address into a physical address. In such an implementation, the trigger circuitry may be arranged, when the prefetch trigger signal is issued, to provide the physical address in association with the prefetch trigger signal, thereby avoiding a need for address translation when the higher level prefetch procedure is performed. This can hence improve efficiency in certain situations.

In one example implementation, the request handling circuitry is arranged, when the associated data for the given prefetch request is subsequently evicted from the further (i.e. higher level) cache circuitry without that associated data being accessed in the further cache circuitry by the processing circuitry, to store that associated data in the (lower level) cache circuitry and to restore status information maintained by the apparatus for that associated data to a state that status information would have had had the prefetch trigger signal not been issued when the given prefetch request was processed. In particular, in this scenario it is determined that the promotion of the data into the higher level cache served no useful purpose, and hence it would be desirable to put the system back into a state that it would have been in had the promotion of the data into the higher level cache not taken place. The eviction circuitry associated with the higher level cache may in principle be able to perform a variety of actions that it considers appropriate. For example, when evicting the line it could erase the prefetch flag and as a result that cache line would not trigger prefetch training upon a hit in the lower level cache, because that hit would be considered to be on a non-prefetched line. It would hence be desirable in the above situation to avoid the eviction circuitry erasing the prefetch flag. In addition, it would be desirable to ensure that prefetch source information is not overwritten upon eviction. In particular, it would be desirable to ensure that a hit on the cache line in question when in the lower level cache will trigger prefetch training and accuracy update processes as it would have done in the original case where the data had been allocated into the lower level cache, and not promoted into the upper level cache.

As another example, the eviction logic may in principle be able to decide not to allocate the evicted cache line in the immediately lower level cache, but to push that cache line down to an even further lower level of cache by performing an eviction bypass process. It would be desirable to ensure this did not happen in the above example of a cache line that had been promoted into the higher level cache but then not used, since it is desirable for such a cache line to be evicted into the immediately lower level cache so as to replicate the position that would have been present had that cache line not been promoted into the higher level cache in the first place.

The above description has concentrated on features provided in a lower level cache to cause promotion of data into a higher level cache. In another example arrangement, an apparatus may be provided to implement the upper level cache in a way that enables it to respond to prefetch trigger signals issued by the lower level cache. In particular, in one example arrangement an apparatus can be provided that has further cache circuitry arranged to form a higher level of a multi-level memory hierarchy than cache circuitry at a lower level of the multi-level memory hierarchy, the further cache circuitry providing a cache storage to store data for access by processing circuitry. In addition, control circuitry can be provided that, in response to a prefetch trigger signal received from trigger circuitry associated with the cache circuitry at the lower level of the multi-level memory hierarchy, causes a request to be asserted for the further cache circuitry providing an address indication identified by the prefetch trigger signal. The request then causes associated data identified by the address indication to be retrieved into the further cache circuitry from the cache circuitry, that associated data having been retrieved into the cache circuitry by prefetching activity performed at the lower level of the multi-level memory hierarchy for the cache circuitry. Hence this apparatus can take the form of the earlier-mentioned higher level cache that responds to the prefetch trigger signals issued by the lower level cache discussed earlier. The control circuitry can take a variety of forms dependent on implementation, but in one example implementation may include at least prefetch circuitry associated with the higher level cache.

In one example implementation, the control circuitry may be arranged to cause the request to be asserted as a linefill request from the apparatus without performing a lookup in the further cache circuitry. This can improve efficiency by avoiding the need to perform a lookup prior to issuing the linefill request. In particular, in modern data processing systems, structures may be in place that avoid requests being issued by one level of cache for data that is already present in another level of cache. For example, in the lower level cache, there may be a snoop filter structure to track which data is already present in a higher level cache, and the request will not be propagated from the lower level cache if the data is already in the higher level cache. Hence, in such a system, it can be arranged that the prefetch trigger signal will not be issued if it is known that the data is already in the higher level cache. Thus, when the prefetch trigger signal is received by the higher level cache, it can be determined that there is no need to perform a lookup in the higher level cache, and the prefetch trigger signal can be processed by moving directly to the assertion of a linefill request.

It should however be noted that the ability to skip such a cache lookup, and indeed the ability to skip address translation in some instances as discussed earlier, are optional. Whilst in the general case it may be that neither address translation nor cache lookup are required in the higher level cache when processing the prefetch trigger signal, there could in some implementations be rare corner cases that need to be considered. For example, there could be a translation invalidation between the time the virtual address to physical address translation in the lower level cache is determined, and that address translation is potentially used in the higher level cache. If the translation has been invalidated in the meantime, then translation would need to be reperformed.

In one example implementation, the above-mentioned control circuitry is arranged to output indication of use information for receipt by training circuitry associated with the cache circuitry at the lower level of the multi-level memory hierarchy, the indication of use information being indicative of use by the processing circuitry of data stored in the further cache circuitry as a result of the prefetch trigger signal. As discussed earlier, this can enable the lower level cache to maintain correct training and accuracy information for prefetched cache lines that have been promoted into the higher level cache through use of the techniques described herein.

Particular example implementations of the techniques described herein will now be discussed with reference to the figures.

FIG. 1 is a block diagram illustrating a data processing system in accordance with one example implementation. Processing circuitry 10 is arranged to perform data processing operations, and during the performance of those data processing operations may manipulate data values stored in memory. As shown in FIG. 1, the memory system may implement a multi-level memory hierarchy comprising one or more levels of cache and main memory. In the example shown in FIG. 1, the processing circuitry 10 is coupled to a level 1 data cache 15, which in turn is coupled to a level 2 data cache 20, and which in turn is coupled to one or more further levels of cache and/or main memory (shown collectively by reference numeral 25 for simplicity).

Prefetch circuitry may be provided in association with one or more caches to monitor the accesses made to data in order to seek to identify patterns in those accesses and hence estimate data that is likely to be accessed by the processing circuitry 10. In the example shown in FIG. 1, prefetch circuitry 30 may be provided in association with a level 1 data cache 15, which is arranged to be monitor the accesses made to the level 1 data cache, and based on analysis of that monitored activity may issue a number of prefetch requests to the level 1 data cache 15. In addition, as shown the level 1 data cache will receive demand access requests from the processing circuitry, and circuitry within the level 1 data cache will perform a lookup operation in respect of each demand access request in order to determine whether data at the address indicated by the demand access request is already stored within the level 1 data cache 15 or not. If it is, then the demand access request can be processed by the level 1 data cache, for example returning the data to the processing circuitry 10 in the event of a read request, or allowing write data to be written into the relevant cache line in the event of a write request. In the event of a miss being detected within level 1 data cache, then the request can be propagated on from the level 1 data cache 15 to the level 2 data cache 20 in order to seek to retrieve into the level 1 data cache the relevant data, so that the demand access request from the processing circuitry can then be responded to.

Similarly, in response to a prefetch request from the level 1 prefetch circuitry 30, the level 1 data cache 15 can propagate on a request to the level 2 data cache (assuming the data associated with the prefetch request is not already stored within the level 1 data cache) in order to prefetch into the level 1 data cache the data associated with the memory address specified by the prefetch request. If the level 1 prefetch circuitry 30 has correctly detected a demand access that is likely to be made by the processing circuitry in the near future, then when that demand access request is issued by the processing circuitry 10, a hit will be detected within the level 1 data cache due to the prefetched data, and hence this can significantly improve performance by reducing the number of misses within the level 1 data cache, and hence reducing the need to request data from lower levels of the memory hierarchy.

Similarly, as shown in FIG. 1, prefetch circuitry 35 may be provided in association with the level 2 data cache 20 to operate in an analogous manner to that discussed above in respect of the level 1 prefetch circuitry 30. Hence, the level 2 prefetch circuitry 35 can monitor the accesses made within the level 2 data cache 20 in response to requests received by the level 2 data cache, and seek to identify patterns of accesses so that appropriate prefetch requests can be issued to the level 2 data cache to prefetch data into the level 2 data cache in anticipation of a request being received for that data. Given that caches tend to be larger and more complex at lower levels of the memory hierarchy, larger and more complex prefetch circuits can more readily be accommodated in association with such caches. Hence, the level 2 prefetch circuitry 35 may be larger and more complex than the level 1 prefetch circuitry 30. It has been observed that in some instances the level 2 prefetch circuitry 35 may be able to reliably predict certain data to be prefetched into the level 2 cache, whilst the level 1 prefetch circuitry may not be able to predict the need for that data and hence that data will not be prefetched into the level 1 cache. Whilst the accurate prefetching by the level 2 prefetch circuitry 35 can give rise to significant performance improvements, due to data required by the processing circuitry being prefetched into the level 2 data cache, the performance benefits could be even better if that data had been prefetched into the level 1 data cache 15. However, it is desirable not to increase the cost and complexity of the level 1 prefetch circuitry 30, since the aim is to provide a level 1 in the memory hierarchy that is small, fast and energy efficient.

As will be discussed in more detail with reference to the remaining figures, in accordance with the techniques set out herein, this problem is alleviated by providing trigger circuitry at the level 2 stage that, for certain prefetch requests issued by the level 2 prefetch circuitry 35, can be arranged to issue a prefetch trigger signal to the level 1 prefetch circuitry 30 (or indeed to other control circuitry associated with the level 1 data cache 15 if there is no level 1 prefetch circuitry 30 provided). Such a prefetch trigger signal issued for a given prefetch request will cause the level 1 data cache to trigger a prefetch procedure to retrieve from the level 2 data cache 20 into the level 1 data cache 15 the data that is the subject of that given prefetch request issued to the level 2 data cache. Hence, by such an approach, the data that is the subject of a level 2 prefetch request can be prefetched into the level 2 data cache 20 as usual, but can effectively be promoted into the level 1 data cache 15 as a result of the prefetch trigger signal issued from the level 2 data cache.

Whilst such an approach could in principle be taken for any number of prefetch requests issued to the level 2 data cache, it will typically be the case that the level 1 data cache is significantly smaller than the level 2 data cache, and hence this triggering mechanism may in some implementations desirably be limited to only a certain subset of the prefetch requests issued by the level 2 prefetch circuitry. In one example implementation, the level 2 prefetch circuitry 35 may include training circuitry that, in addition to performing training processes to seek to detect patterns of accesses, can also keep a record of how accurate previous prefetch requests were, and in particular whether the data that was prefetched was in fact consumed by the processing circuitry. This accuracy information can in one example implementation be used to filter which prefetch requests should have the above-mentioned prefetch trigger signal issued in respect of them, with the aim that only data that is considered highly likely to be used by the processing circuitry will then get promoted into the level 1 data cache 15.

Once data has been promoted into the level 1 data cache due to the use of the prefetch trigger signal, it can be useful to ensure that the earlier-mentioned training circuitry associated with the level 2 prefetch circuitry 35 gets feedback from the level 1 data cache as to how useful that prefetched data was, and in particular whether the processing circuitry accessed that data within the level 1 data cache 15. This can be achieved by the feedback of use indication information to the level 2 prefetch circuitry 35 from the level 1 circuitry, for example from the level 1 prefetch circuitry 30 that is monitoring the activity of accesses made to the level 1 data cache 15.

Whilst, in the example of FIG. 1, the techniques described herein for causing prefetched data to be promoted into a higher level of the memory hierarchy is described with reference to level 2 of the memory hierarchy issuing prefetch trigger signals to level 1 to cause the data to be promoted into the level 1 data cache, it will be appreciated that this is merely one example, and the techniques described herein could be used for any two levels of cache where there is an opportunity to move data from a lower level cache to a higher level cache (and hence merely by way of example the technique described herein could be used in association with a level 3 cache to cause data to be promoted into a level 2 cache). Also, whilst in the example of FIG. 1 data caches are considered, the technique could also be used in association with an instruction cache. For example, at level 1 of the memory hierarchy there may be a separate data cache and a separate instruction cache, and the above described technique performed at the level 2 of the memory hierarchy could cause prefetch trigger signals to be issued to components associated with the level 1 instruction cache, so as to cause cache lines containing a series of instructions to be promoted from level 2 of the memory hierarchy into the level 1 instruction cache.

Figure 2:
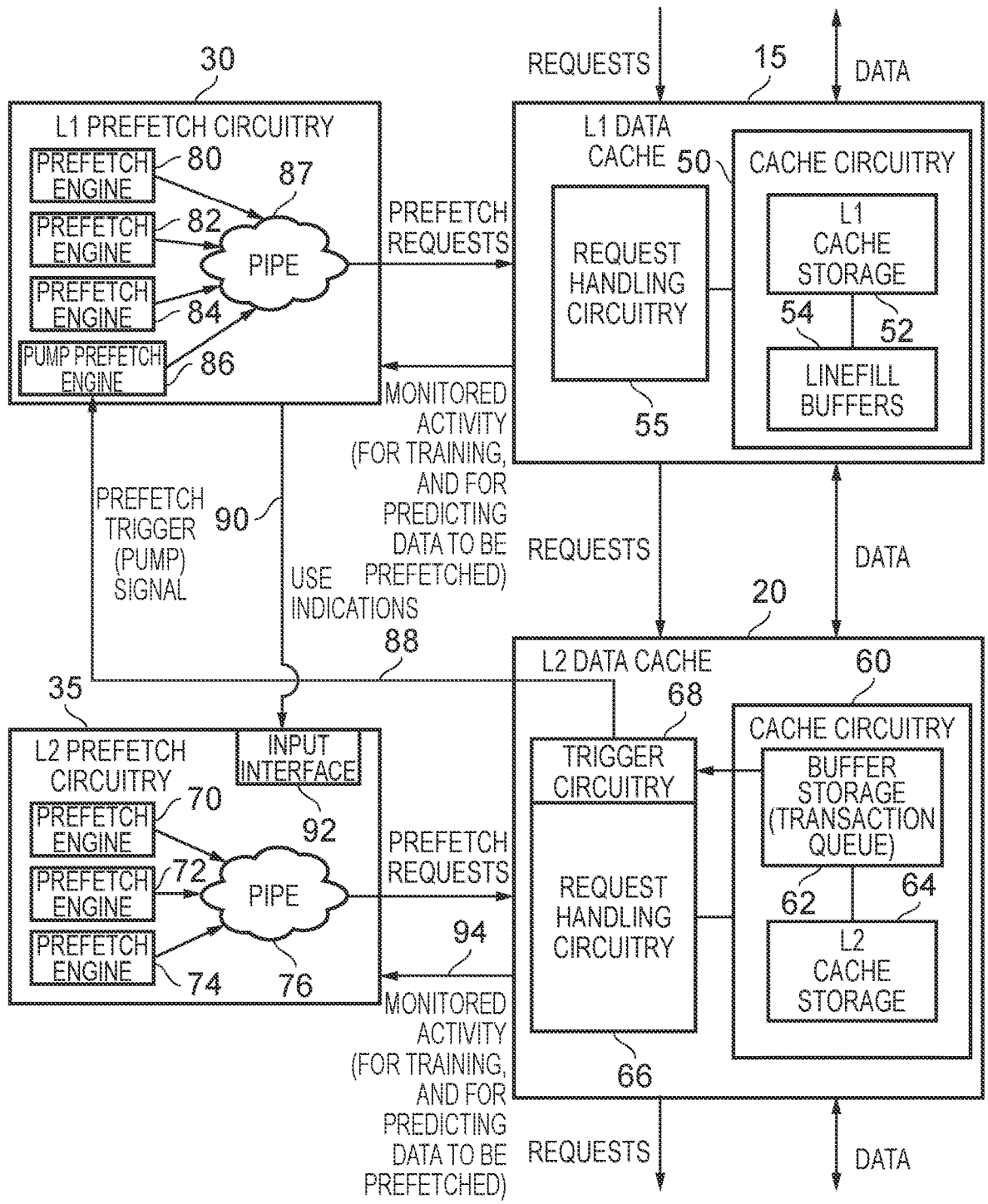
FIG. 2 is a block diagram illustrating in more detail the level 1 and level 2 cache and prefetch circuits of FIG. 1, in accordance with one example implementation.

FIG. 2 is a block diagram providing more detail of components provided at level 1 and level 2 of the memory hierarchy in the example implementation of FIG. 1. The level 1 data cache 15 may comprise cache circuitry 50 to store data for access by the processing circuitry 10, and request handling circuitry 55 to process requests received by the level 1 data cache 15. Whilst in one example implementation, the cache circuitry 50 may merely include cache storage 52 providing a plurality of cache lines into which to store data, it is often the case that there is buffer storage associated with the cache storage, such as the linefill buffers 54 shown in FIG. 1. When a request is received by the request handling circuitry 55, a lookup can be performed within the cache storage 52 in order to determine whether the data associated with the address specified by that request is already stored within the cache storage or not. If not, then an entry can be populated within the linefill buffers 54 to track a request propagated onwards to the level 2 data cache. When that onward request is subsequently processed and the data returned, that data can be stored within the linefill buffers 54 for subsequent draining into the level 1 cache storage 52.

The level 1 prefetch circuitry 30 may include multiple prefetch engines 80, 82, 84 (three are shown in FIG. 2 purely by way of example and the exact number will depend on implementation) for monitoring the access activity within the associated level 1 data cache 15, and for seeking to identify patterns of accesses. That monitored activity may be used to train the prefetch engines so that as time progresses, and a larger body of monitored activity is analysed, the prefetch engines can become more accurate at detecting patterns of accesses. Each of the prefetch engines 80, 82, 84 may be arranged to look for a different access pattern, or some may be arranged to essentially look for the same access pattern, but with a different parameter such as a stride parameter. Based on the patterns detected, the prefetch engines 80, 82, 84 may issue signals to the prefetch pipeline 87 to cause a series of prefetch request to be issued to the level 1 data cache 15. Typically demand access requests from the processing circuitry will take precedence over prefetch requests, but the request handling circuitry 55 will process the prefetch requests as and when it has capacity to do so, in order to cause data to be prefetched into the level 1 cache storage 52.

Level 2 of the memory hierarchy can be constructed in a similar way. Hence, the level 2 data cache 20 may comprise cache circuitry 60 for storing data for access by the processing circuitry, and whilst in some implementations this may just include a level 2 cache storage 64, in the example implementation shown in FIG. 2 this includes buffer storage 62, also referred to herein as a transaction queue. When an access request is received by the request handling circuitry 66, it can perform a lookup within the cache circuitry 60 in order to determine whether the data that is the subject of that access request is already stored within the cache circuitry or not. If it is, then the request can be processed using the data held in the cache circuitry 60. However, if it is not, then an entry can be made within the transaction queue to track that outstanding request, and an onward request can be propagated from the level 2 data cache to a lower level of the memory hierarchy. When the data associated with that request is subsequently returned from the lower level of the memory hierarchy, it can be stored within the relevant entry of the transaction queue, and in due course may be drained into the level 2 cache storage 64, for example to free up space within the transaction queue for receiving additional requests.

The level 2 prefetch circuitry 35 may include a number of prefetch engine 70, 72, 74 that, in an analogous manner to the prefetch engines discussed earlier with reference to the level 1 prefetch circuitry 30, may be arranged to monitor the activity of accesses to the level 2 data cache, in order to seek to detect patterns of accesses. That monitored activity may be used to train the prefetch engines so that as time progresses, and a larger body of monitored activity is analysed, the prefetch engines can become more accurate at detecting patterns of accesses. As with the discussion of the prefetch engines 80, 82, 84 associated with the level 1 prefetch circuitry 30, the various prefetch engines 70, 72, 74 may be arranged to seek to detect different types of patterns, or some may be arranged to detect essentially the same form of pattern, but with a different parameter such as a stride parameter. Based on the patterns detected, the prefetch engines 70, 72, 74 may issue signals to the prefetch pipeline 76 to cause a series of prefetch request to be issued to the level 2 data cache 20.

As shown in FIG. 2, the level 2 data cache 20 may also include trigger circuitry 68 that is arranged to observe the prefetch requests issued by the level 2 prefetch circuitry 35 to the request handling circuitry 66, and when a specified condition is detected in respect of a given prefetch request, it can be arranged to issue a prefetch trigger signal (also referred to herein as a pump signal) over path 88 to control circuitry associated with the level 1 data cache. In implementations such as that shown in FIG. 2 where there is level 1 prefetch circuitry 30, then the pump signal may be issued to the level 1 prefetch circuitry 30. However, it should be noted that there is no requirement for dedicated prefetch circuitry to be provided at the level 1 stage, and in those instances the pump signal may be received by control circuitry that is used to generate a prefetch request locally that can be stored within one of the linefill buffers 54 to cause a request to be issued to the level 2 data cache in order to promote the relevant data into the level 1 cache.

In the example shown in FIG. 2, the level 1 prefetch circuitry 30 is provided with an additional prefetch engine 86, referred to in FIG. 2 as the pump prefetch engine. The pump prefetch engine is responsive to receipt of the prefetch trigger signal to issue control signals to the pipeline 87 in order to cause a prefetch request to be issued to the level 1 data cache 15 specifying the address indication included with the prefetch trigger signal. This will in due course cause an entry to be made within the linefill buffers 54 and a request issued to the level 2 data cache 20 in order to cause the data in question to be promoted from the level 2 data cache into the level 1 data cache 15.

Since the prefetch trigger signal is issued by the trigger circuitry 68 for a prefetch request that has been issued to the level 2 cache, it will be appreciated that the request handling circuitry 66 will process that prefetch request in order to prefetch the data into the cache circuitry 60 of the level 2 data cache 20 (in one example implementation this data first being prefetched into the transaction queue 62, with the aim that that data will then in due course be drained into the level 2 cache storage 64). In accordance with one example implementation, the timing of issuance of the prefetch trigger signal from the trigger circuitry 68 is such that by the time that prefetch trigger signal has been processed by the level 1 prefetch circuitry 30, and a prefetch request has been issued that has caused an entry to be made within the linefill buffer 54 and a request to be issued to the level 2 data cache 20, the data will present within the transaction queue 62. Hence, a hit will be detected for that data within the level 2 data cache, and the data can be returned directly to the level 1 data cache without delay using the contents of the relevant entry in the transaction queue 62. This can be beneficial, since as mentioned earlier the level 1 data cache is typically significantly smaller than the level 2 data cache, and hence the number of linefill buffers 54 may be quite limited. It would hence be desirable that the entry populated within the linefill buffer due to the above-mentioned pumping activity will not need to stay within the linefill buffer for long.

In one particular example implementation, the trigger circuitry 68 is arranged to monitor the transaction queue 62, and only issue the prefetch trigger/pump signal once the data in question has been retrieved into the relevant entry of the transaction queue, such that when a request is subsequently issued from the level 1 data cache due to that pumping activity, the data should be immediately available to return to the level 1 data cache. However, it will be appreciated that in other example implementations the trigger circuitry 68 may be able to issue the prefetch trigger signal slightly earlier than that, for example based on knowledge of the latency associated with the processing of the prefetch trigger signal by the level 1 stage, and hence the expected delay between issuance of the prefetch trigger signal and a resultant request actually being issued to the level 2 data cache from the level 1 data cache for the data in question. Hence, for example it may be possible to issue the prefetch trigger signal prior to a point in time where the relevant entry in the transaction queue has received all of the data associated with the prefetch request.

In one example implementation, once the data has been promoted into the cache circuitry 50 of the level 1 data cache 15 from the transaction queue 62 of the cache circuitry 60 of the level 2 data cache 20, the transaction queue 62 may be arranged to free up the relevant entry without draining the data to the level 2 cache storage 64, since at that point it is known that the data is now in the level 1 data cache 15. Such an approach can free up space in the level 2 cache storage 64, and can for example be beneficial when the level 1 and level 2 caches are operated as exclusive caches, since it can improve efficiency.

As noted earlier, the level 2 prefetch circuitry 35 can perform training processes based on the monitored activity of accesses in the level 2 data cache in order to seek to recognise certain patterns of accesses. It can also maintain accuracy information in association with previously issued prefetch requests indicative of whether the data associated with those prefetch requests were actually requested by the processing circuitry, and hence whether those prefetch requests were useful. This information can then be factored in by the prefetch engines 70, 72, 74 when deciding suitable prefetch requests to be issued going forwards. However, when the above described technique is used to trigger promotion of the data into the level 1 data cache 15, the level 2 prefetch circuitry 35 may lose sight of that training/accuracy update information, since if the data is useful, a request from the processing circuitry 10 will result in a hit in the level 1 data cache 15, and hence no request will be issued on to the level 2 data cache.

In one example implementation, to ensure that the level 2 prefetch circuitry still receives information to enable it to perform its training routines and maintain the above accuracy information, use indication information may be passed over path 90 to an input interface 92 of the level 2 prefetch circuitry providing an indication of the usefulness of any data that was promoted into the level 1 data cache using the above described mechanism. This information can for example include address indications and hit information indicative of accesses made by the processing circuitry to the data associated with those address indications. Whilst in FIG. 2 the line 90 is shown as a dedicated line for clarity, in one example implementation that use indication information could be provided to the level 2 prefetch circuitry over the same path 94 used to provide various other forms of monitored activity used by the level 2 prefetch circuitry 35 to train the prefetch engines and maintain accuracy information.

Figure 3:
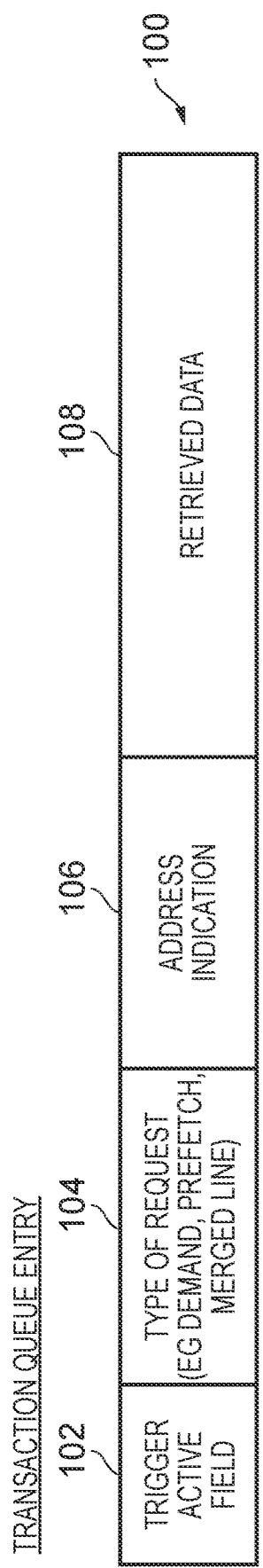
FIG. 3 schematically illustrates fields provided within a transaction queue entry in accordance with one example implementation.

FIG. 3 schematically illustrates fields provided within a transaction queue entry 100 in accordance with one example implementation. A first field 104 is used to indicate the type of request that is being tracked in the entry. This may for example distinguish between demand requests received from an upper level of the memory hierarchy and prefetch requests received from the level 2 prefetch circuitry 35. It is also possible that other types of information may be useful to retain in this field. For example, it may be that a prefetch request is in progress, and in the meantime a demand request specifying the same address is received. This could be flagged using an appropriate bit within the field 104 to identify the access as a merged access. In addition, an address indication field 106 is used to provide an indication of the memory address associated with the request, and a separate field 108 is used to temporarily buffer the retrieved data. Hence, the transaction queue entry can be initially populated with information in the fields 104 and 106, and then when the data is subsequently retrieved it can be added into the field 108.

In accordance with the techniques described herein, an additional field 102 (referred to herein as a trigger active field) can be used to identify a transaction queue entry for which the trigger circuitry 68 has asserted the prefetch trigger signal. Whilst this trigger active field 102 could take a variety of forms, in one example implementation it may merely be a single bit field which is set for an entry for which the trigger circuitry 68 has asserted the prefetch trigger signal. Whilst the decision whether to issue a prefetch trigger signal or not for any given prefetch request could be taken by the trigger circuitry at various points in time, in one particular example implementation that decision is taken once the retrieved data has been populated in the field 108, and then the prefetch request is assessed by the trigger circuitry in order to determine whether a prefetch trigger signal should be asserted. For example, the trigger circuitry may have reference to the accuracy information associated with the prefetch address, so as to only issue the prefetch trigger signal in association with a prefetch request that at least meets a threshold level of accuracy.

It can be useful to provide the trigger active field, since it may be desired to treat entries associated with an active prefetch trigger differently to other entries. For example, as mentioned earlier entries in the transaction queue can be drained into the level 2 cache storage 64 for a variety of reasons. However, for an entry for which the prefetch trigger signal has been asserted, it may be desirable to ensure that that entry is not drained, so as to ensure that the data is still present in the entry of the transaction queue 62 when in due course a request for that data is received from the level 1 data cache 15 due to the processing of the prefetch trigger signal.

Figure 4A:
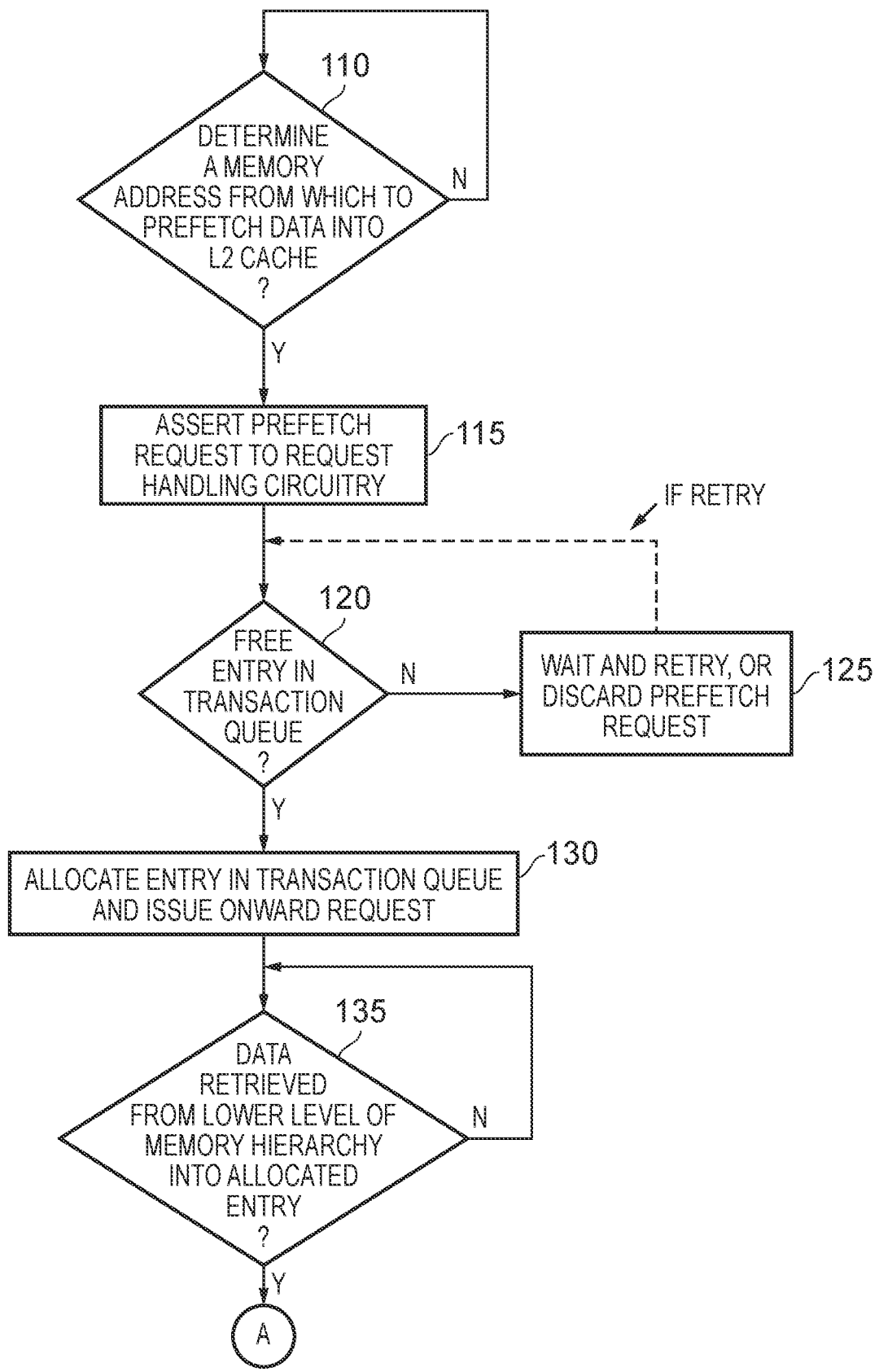
FIGS. 4A and 4B provide a flow diagram illustrating a prefetching technique employed in one example implementation.
Figure 4B:
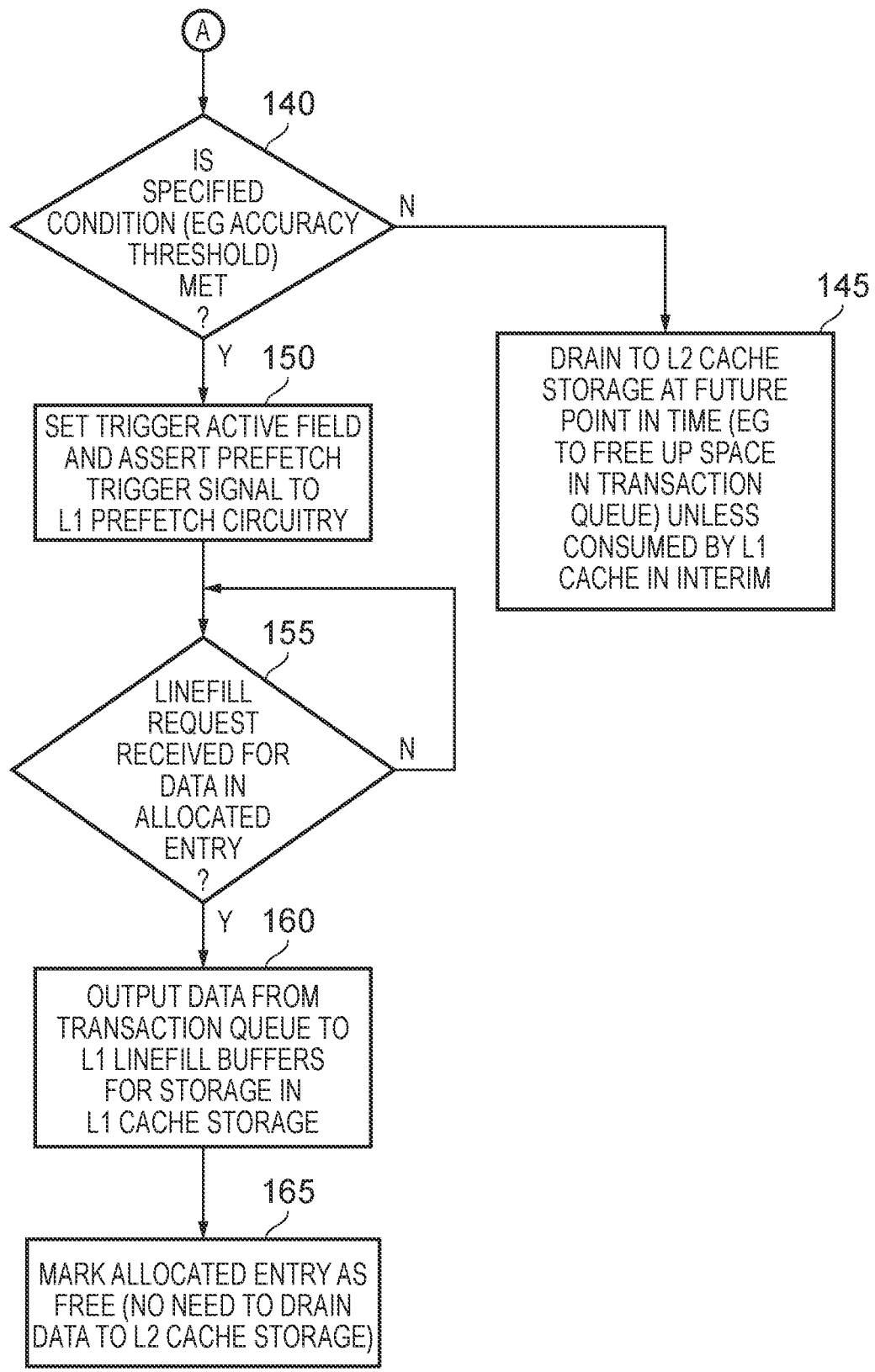

FIGS. 4A and 4B provide a flow diagram illustrating a prefetching technique employed in one example implementation. At step 110 it is evaluated whether the level 2 prefetch circuitry 35 has determined a memory address from which to prefetch data into the level 2 data cache 20. If so, then at step 115 a prefetch request is asserted from the level 2 prefetch circuitry 35 to the request handling circuitry 66 of the level 2 data cache 20. Request handling circuitry 66 can then determine at step 120 whether there is a free entry in the transaction queue 62 in which details of the prefetch request can be stored. If not, then in one example implementation, as shown in FIG. 4A, the process may wait at step 125 and subsequently retry (i.e. reassess whether there is a free entry in the transaction queue), or alternatively the prefetch request may in that instance be discarded. In particular, it is to be noted that deciding to drop a prefetch request rather than processing it has no adverse effect on correct operation of the system. The only effect is that there could in due course be an associated drop in performance due to a miss occurring within the cache when instead a hit would have occurred had the data been prefetched.

Once a free entry has been detected at step 120, then an entry is allocated in the transaction queue at step 130, and an onward request is propagated to a lower level of cache/main memory. Thereafter, the process waits at step 135 until it is determined that the data has been retrieved from the lower level of the memory hierarchy into the allocated entry, at which point the data field 108 of the entry 100 will be populated.

At this point, at step 140 the trigger circuitry 68 can determine whether a specified condition is met in relation to that prefetch request. This can take a variety of forms, but in one example implementation it is necessary for the accuracy information associated with the address for which the prefetch request has been issued to meet or exceed a given accuracy threshold. As will be discussed later, in some example implementations other factors may also be evaluated at this point in order to determine whether the specified condition is present. Merely by way of example, if at the time the assessment is made the type of request field 104 indicates that the prefetch request has been merged with a demand request, it may be decided that the specified condition is not present, since there is no need to seek to promote the data into the level 1 data cache as that will naturally occur as a result of processing the demand access request for that data.

If the specified condition is determined to be absent at step 140, then the process proceeds to step 145 were processing proceeds as normal. In particular, the prefetch process within the level 2 data cache will have completed, and in due course the relevant entry in the transaction queue may be drained into the level 2 cache storage 64 unless it is consumed by the level 1 data cache in the interim. There are a variety of reasons that could cause the transaction queue entry to be drained. For example, this could be done in order to free up space in the transaction queue for new transactions.

If at step 140, it is determined that the specified condition is present, then at step 150 the trigger active field 102 is set within the relevant entry 100 of the transaction queue 62, and the trigger circuitry 68 asserts the prefetch trigger signal to the level 1 prefetch circuitry. As discussed earlier, by flagging the transaction queue entry to indicate that the earlier-mentioned prefetch trigger/pump process is in progress, this can cause the entry in the transaction queue to be treated differently when compared with a situation where the prefetch trigger is not issued. For example, as mentioned earlier, the setting of the trigger active field may prevent the entry being drained to the level 2 cache storage 64 since it is known that a request should soon be received from the level 1 data cache for that data, and it would be more efficient to provide the data directly back to the level 1 data cache from the transaction queue.

At step 155, it is determined whether such a request has been received. In particular, a linefill request is expected to be received for the data in the allocated entry, and when that linefill request is received, then at step 160 the level 2 data cache 20 will output the data from the relevant transaction queue entry to the level one linefill buffers 54, for subsequent storage in the level 1 cache storage 52. In one example implementation, as shown by step 165, at this point the allocated entry in the transaction queue is marked as free/available, since there is no need to drain the data from that entry to the level 2 cache storage 64.

Figure 5:
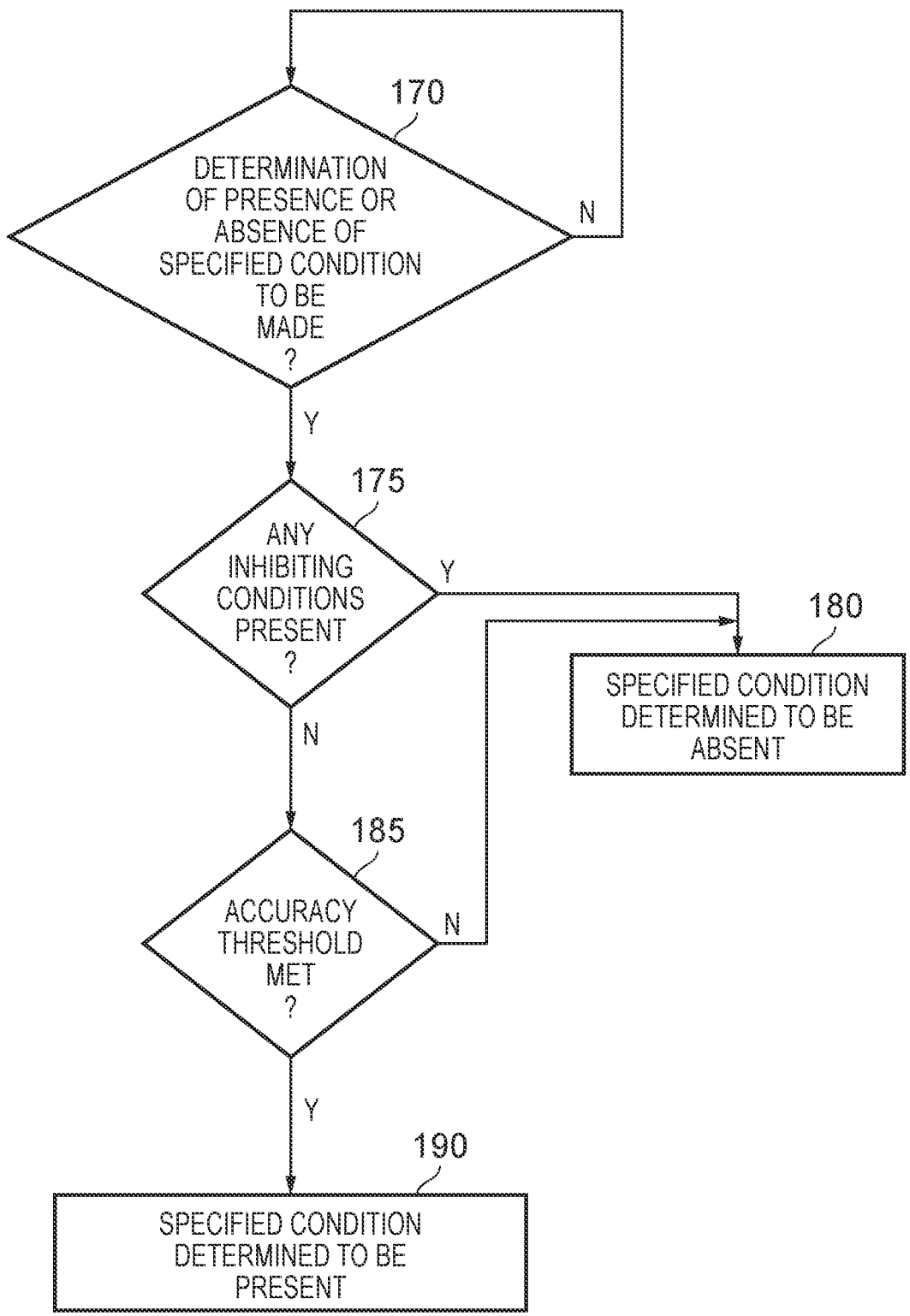
FIG. 5 is a flow diagram illustrating steps that may be performed in order to determine the presence or absence of a specified condition used to determine whether to assert a prefetch trigger signal, in accordance with one example implementation.

FIG. 5 is a flow diagram illustrating steps that may be performed in order to determine the presence or absence of the above-mentioned specified condition, in accordance with one example implementation. At step 170, when it is determined that evaluation of the presence or absence of the specified condition is to be made, it is then determined at step 175 whether any inhibiting conditions are present. These could take a wide variety of different forms. For example, as mentioned earlier, if the type of request field 104 for the relevant entry 100 indicates that the request is now a merged request, it may be decided that that indicates the presence of an inhibiting condition. As another example, the caches may be able to operate in different modes of operation, and in some modes of operation it may be inappropriate to perform any prefetching into the level 1 data cache. As a particular example, the level 1 cache may be operating in write streaming mode. In write streaming mode, write requests to the level 1 data cache may still result in a lookup, but if a miss is detected, then the data is written out to the level 2 cache rather than starting a linefill into the level 1 cache. In such instances, it may be inappropriate to seek to perform linefills into the level 1 data cache using the above mentioned prefetch trigger mechanism, and accordingly this can be viewed as another type of inhibiting condition.

If any inhibiting conditions are detected to be present at step 175, then at step 180 the specified condition is determined to be absent, and as a result a prefetch trigger signal is not asserted by the trigger circuitry 68, and hence no attempt is made to promote the prefetched data into the level 1 data cache 15. However, if no inhibiting conditions are found be present, it is then determined at step 185 whether the earlier-mentioned accuracy threshold has been met for the memory address in question. If not, then again it is determined at step 180 that the specified condition is absent. However, if the accuracy threshold is met then it is determined at step 190 that the specified condition is present. As a result, the prefetch trigger/pump signal will be asserted over path 88, and the earlier described mechanism will be implemented in order to seek to promote the data in question from the level 2 data cache into the level 1 data cache.

Figure 6:
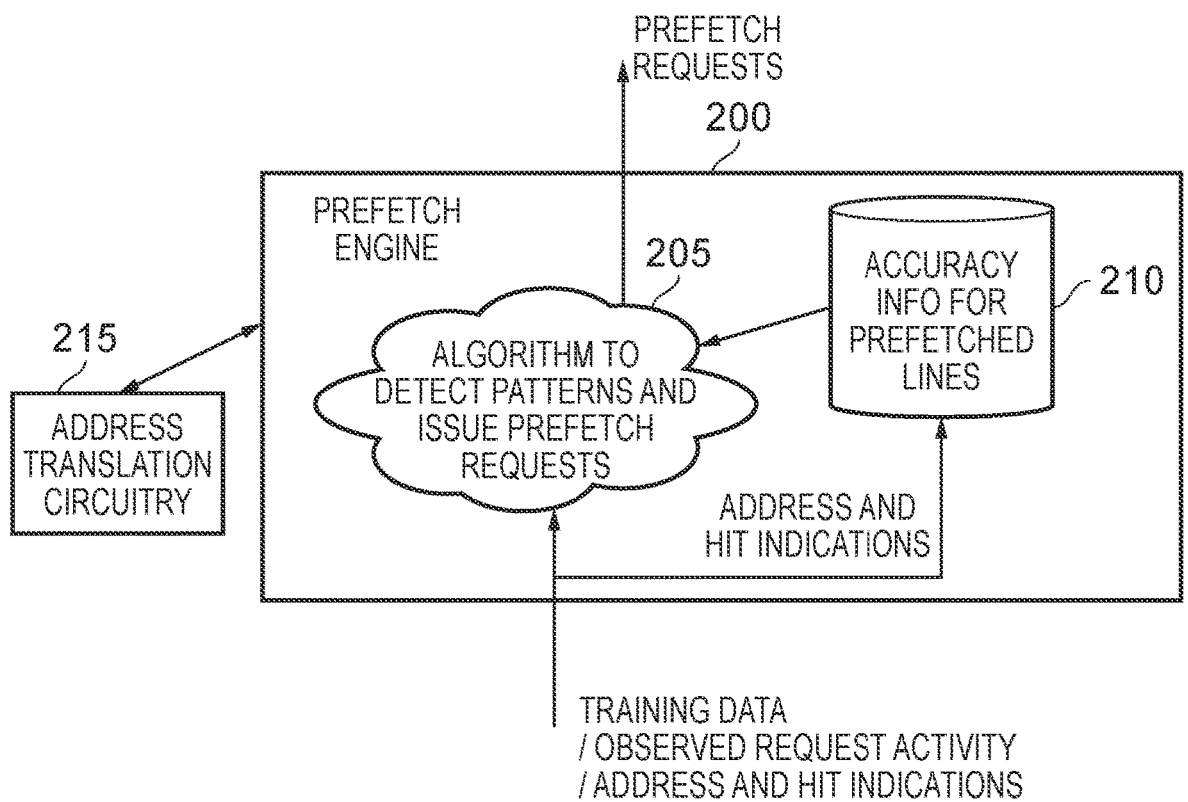
FIG. 6 illustrates a prefetch engine and associated address translation circuitry, in accordance with one example implementation.

FIG. 6 illustrates an example of a prefetch engine 200 that may be provided in association with the level 2 prefetch circuitry 35. As shown by the bubble 205, the prefetch engine may be arranged to apply one or more algorithms in order to seek to detect patterns of accesses and to then issue prefetch requests in dependence on that analysis. As part of that process, it may make reference to accuracy information for prefetched lines maintained in the storage element 210, such accuracy information indicating how useful prefetching of the data for certain addresses has proven to be in the past. As shown in FIG. 6, training data in the form of observed request activity can be input to the prefetch engine for the purposes of training. That training data may also include address and hit indications for data that has previously been prefetched, hence giving an indication of how useful previous prefetching has been. In addition to tuning the training process performed for the algorithms 205, the address and hit indication information can be forwarded to the storage element 210 to update the accuracy information.

In one example implementation, the address indications provided by requests may specify virtual addresses, and a virtual address may be translated by address translation circuitry 215 in order to identify a corresponding physical addresses within memory. As will be understood by those skilled in the art, the address translation circuitry can take a variety of forms, and may for example take the form of a memory management unit having access to a translation lookaside buffer (TLB) that can be used to buffer previously determined address translations. When a miss occurs within the TLB, then a page table walk process can be used to access one or more page tables in memory in order to determine how a given virtual address should be converted into a corresponding physical address. As shown in FIG. 6, the prefetch engine 200 can have access to the address translation circuitry 215 in order to perform address translation as required. If the address translation is performed by the prefetch engine, then for a prefetch request for which the trigger circuitry 68 decides to issue a prefetch trigger signal, the associated address indication provided with that prefetch trigger signal can in some implementations take the form of the physical address. As a result, this can avoid the need to perform any corresponding address translation at the level 1 cache when processing the prefetch trigger signal, hence improving performance.

Figure 7:
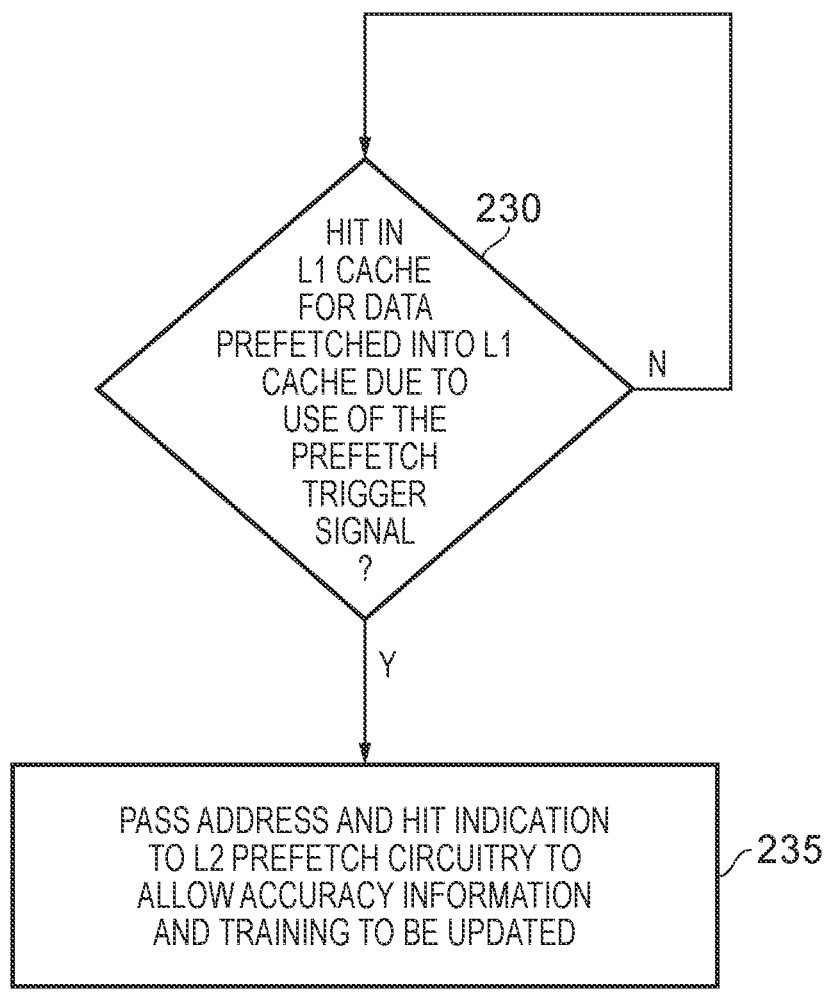
FIG. 7 is a flow diagram illustrating a step taken to pass feedback information to the level 2 cache when data has been allocated into the level 1 cache due to the use of the prefetch trigger signal, in accordance with one example implementation.

As discussed earlier, in order to ensure that the training and accuracy information is maintained appropriately within the level 2 prefetch circuitry 35 for prefetched data that has been promoted into the level 1 data cache using the mechanisms described herein, then the level 1 of the memory hierarchy can be arranged to propagate use indications back to the level 2 of the memory hierarchy indicative of how useful the data promoted into the level 1 data cache has been. FIG. 7 is a flow diagram illustrating this mechanism in one example implementation. In particular, when at step 230 it is determined that a hit has taken place in the level 1 data cache 15 for data prefetched into that level 1 data cache due to the use of the earlier mentioned prefetch trigger signal, then at step 235 an address indication and a hit indication for that data is passed to the level 2 prefetch circuitry to allow the accuracy information and training data within the level 2 prefetch circuitry to be updated accordingly.

Figure 8:
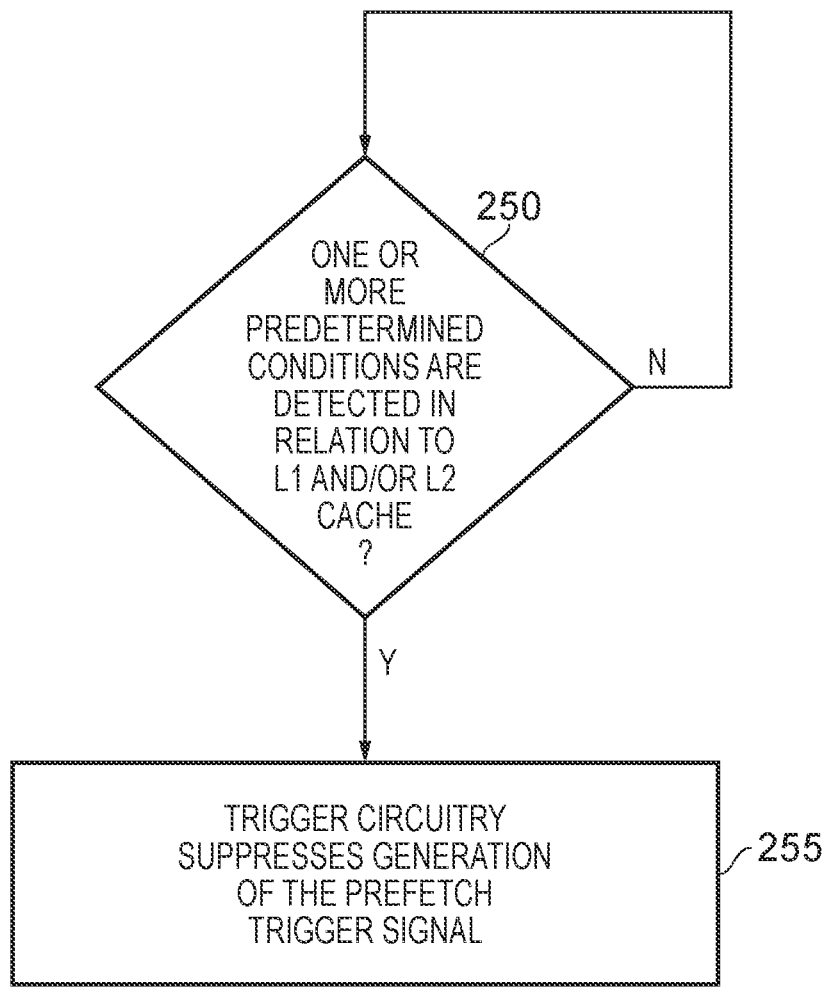
FIG. 8 is a flow diagram illustrating how one or more predetermined conditions may be used to suppress generation of the prefetch trigger signal, in accordance with one example implementation.

FIG. 8 is a flow diagram illustrating how one or more predetermined conditions may be used to suppress generation of the prefetch trigger signal, in accordance with one example implementation. At step 250, it is determined whether one or more predetermined conditions are detected in relation to either or both of the level 1 and level 2 caches. These conditions could take a variety of forms, but in one example implementation they could be conditions indicative of the ability of either or both of the level 1 and level 2 caches to deal with an additional request that may be generated as a result of asserting the earlier mentioned prefetch trigger signal. For instance, within the level 1 data cache, the linefill buffers 54 may be at a high level of occupancy, meaning that there is little spare resource for handling any additional prefetching that may result from assertion of the prefetch trigger signal. Similarly, in the level 2 data cache, there may be a high level of requests being dealt with by the level 2 data cache, and it may be desirable not to increase the number of requests coming from the level 1 data cache (as would be the case were a prefetch trigger signal to be asserted to the level 1 data cache). As another example, it may be observed that a very high hit rate is taking place within the level 1 data cache 15, indicating that the level 1 cache is operating very effectively, and hence additional prefetching may not be particularly beneficial.

In the presence of any of the above situations it may be determined that one or more of the above-mentioned predetermined conditions are present, and in that event, as shown by step 255, the trigger circuitry 68 may be caused to suppress generation of the prefetch trigger signal even if a prefetch request is detected for which a prefetch trigger signal would normally be asserted.

Figure 9:
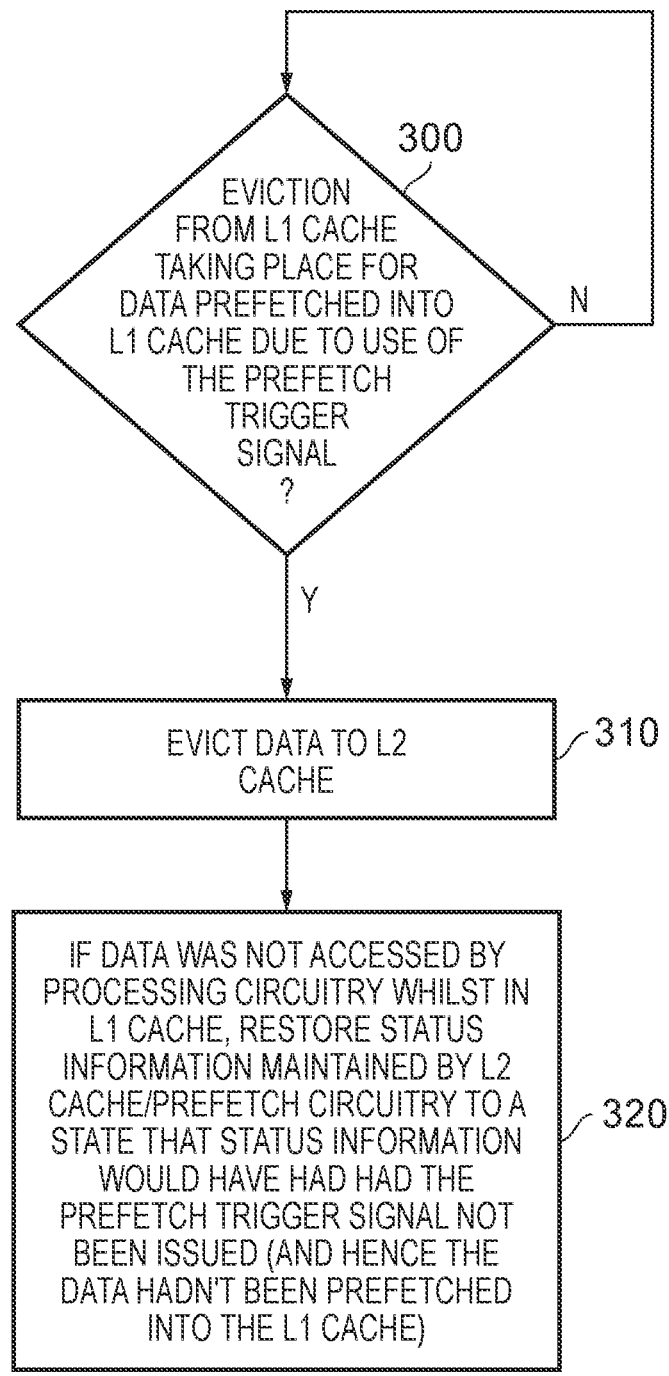
FIG. 9 is a flow diagram illustrating steps taken when evicting data from the level 1 cache that had been stored in the level 1 cache due to use of the prefetch trigger signal, in accordance with one example implementation.

FIG. 9 is a flow diagram illustrating steps taken when evicting data from the level 1 cache that had been stored in the level 1 cache due to the use of the earlier-mentioned prefetch trigger signal, in accordance with one example implementation. At step 300, when it is determined that an eviction is taking place from the level 1 cache for data that was prefetched into the level 1 cache due to the use of the prefetch trigger signal, then at step 310 that data may be evicted for storage in the level 2 cache. However, as indicated by the box 320, an additional analysis may be performed if it is determined that that data was not accessed by the processing circuitry whilst it was in the level 1 cache. In such a scenario, this indicates that the pumping of the data into the level 1 cache served no useful purpose. In such a situation, steps are taken to restore the status information maintained by the level 2 data cache 20 and the level 2 prefetch circuitry 35 to a state that that status information would have had had the prefetch trigger signal not been issued, and hence the data had not been prefetched into the level 1 data cache 15.

The following discussions provides some specific examples as to corrective action which may need to be taken in this respect. The eviction circuitry associated with the L1 cache may in principle be able to perform a variety of actions that it considers appropriate. For example, when evicting the cache line it could erase the prefetch flag and as a result that cache line would not trigger prefetch training upon a hit in the L2 cache, because that hit would be considered to be on a non-prefetched line. It would hence be desirable in the above situation to avoid the eviction circuitry erasing the prefetch flag. In addition, it would be desirable to ensure that prefetch source information is not overwritten upon eviction. In particular, it would be desirable to ensure that a hit on the cache line in question when in the L2 cache will trigger prefetch training and accuracy update processes as it would have done in the original case where the data had been allocated into the L2 cache, and not been promoted into the L1 cache.

As another example, the eviction logic may in principle be able to decide not to allocate the evicted cache line in the L2 cache, but to push that cache line down to a further lower level of cache (e.g. an L3 cache) by performing an eviction bypass process. It would be desirable to ensure this did not happen in the above example of a cache line that had been promoted into the L1 cache but then not used, since it is desirable for such cache lines to be evicted into the L2 cache so as to replicate the position that would have been present had that cache line not been promoted into the L1 cache in the first place.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
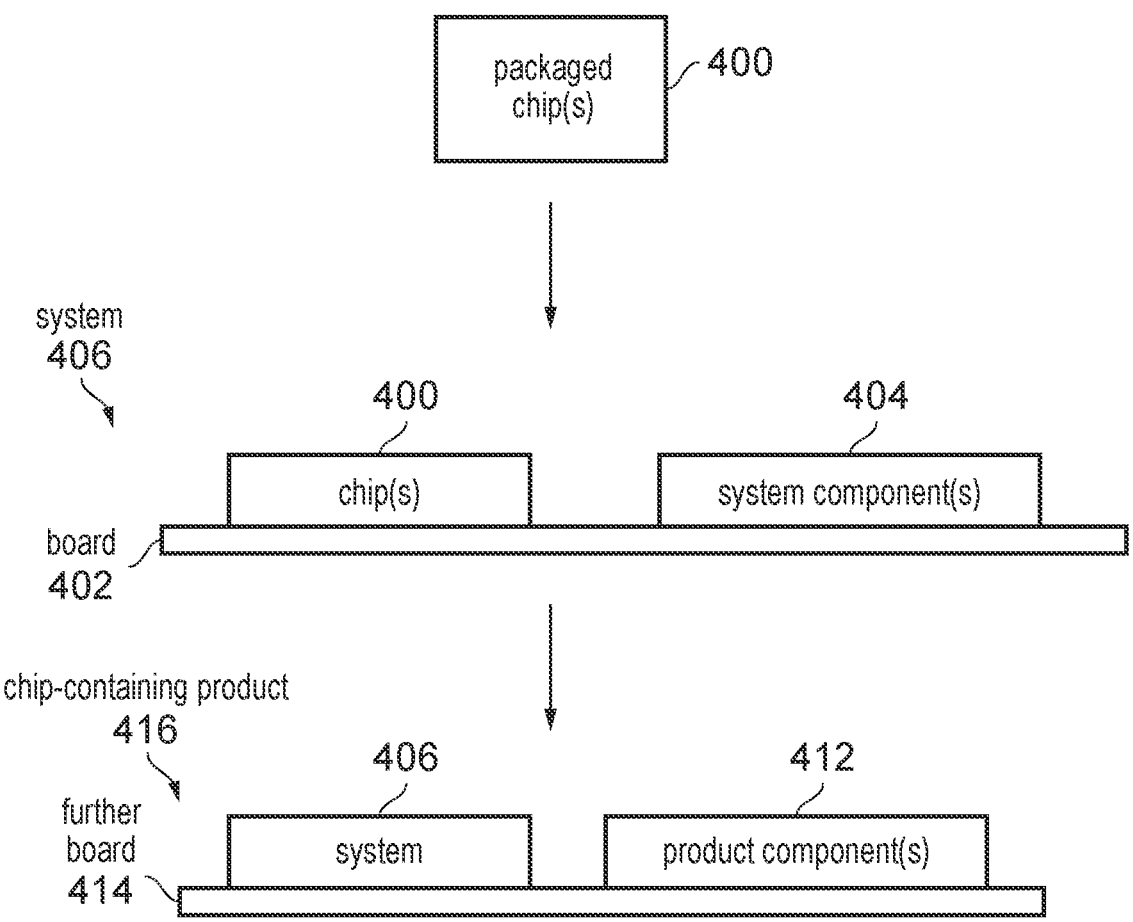
FIG. 10 illustrates a system and a chip-containing product.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some example configurations are set out in the following numbered clauses:

1. An apparatus comprising:
   cache circuitry providing a cache storage to store data for access by processing circuitry;
   request handling circuitry associated with the cache circuitry and arranged to process requests received by the request handling circuitry, each request providing an address indication for associated data and the request handling circuitry being arranged to determine with reference to the address indication whether the associated data is available in the cache circuitry;
   wherein the cache circuitry is arranged to form a given level of a multi-level memory hierarchy, and the request handling circuitry is responsive to determining that the associated data is unavailable in the cache circuitry to issue an onward request to cause the associated data to be retrieved into the cache circuitry from a lower level of the multi-level memory hierarchy than the given level;
   prefetch circuitry to issue, as one type of request to be handled by the request handling circuitry, prefetch requests, and the request handling circuitry being arranged in response to a given prefetch request to retrieve into the cache circuitry the associated data in anticipation of that associated data being requested by the processing circuitry; and
   trigger circuitry, responsive to a specified condition being detected in respect of the given prefetch request, to issue a prefetch trigger signal for receipt by control circuitry associated with further cache circuitry at a higher level of the multi-level memory hierarchy, to cause a higher level prefetch procedure to be triggered by the control circuitry to retrieve the associated data from the cache circuitry into the further cache circuitry.

2. An apparatus as in Clause 1, wherein the request handling circuitry is arranged, in response to the given prefetch request, to initiate retrieval of the associated data into the cache circuitry prior to the trigger circuitry issuing the prefetch trigger signal.

3. An apparatus as in Clause 2, wherein the trigger circuitry is arranged to control timing of issuance of the prefetch trigger signal so that the associated data for the given prefetch request will be present in the cache circuitry by the time performance of the higher level prefetch procedure is seeking to retrieve the associated data from the cache circuitry into the further cache circuitry.

4. An apparatus as in Clause 3, wherein the cache circuitry comprises buffer storage into which data retrieved from the lower level of the multi-level memory hierarchy is buffered prior to being drained from the buffer storage into the cache storage, and the trigger circuitry is arranged to control the timing of issuance of the prefetch trigger signal such that the associated data for the given prefetch request will be present in the buffer storage by the time performance of the higher level prefetch procedure is seeking to retrieve the associated data from the cache circuitry into the further cache circuitry.

5. An apparatus as in Clause 4, wherein:
   the buffer storage comprises a plurality of buffer entries, each buffer entry arranged to store an address indication, an indication of a type of request that provided that address indication, and the associated data when retrieved from the lower level of the multi-level memory hierarchy;
   the buffer storage is arranged to allocate a given buffer entry to store the address indication provided by the given prefetch request; and
   the trigger circuitry is arranged to issue the prefetch trigger signal in response to the associated data being retrieved from the lower level of the multi-level memory hierarchy into the given buffer entry provided the specified condition is determined to be present for the given prefetch request.

6. An apparatus as in Clause 4 or Clause 5, wherein in response to the higher level prefetch procedure causing the associated data for the given prefetch request to be transferred from the buffer storage to the further cache circuitry, the request handling circuitry is arranged to prevent the associated data being drained into the cache storage.

7. An apparatus as in any preceding clause, wherein the trigger circuitry is provided by the request handling circuitry.

8. An apparatus as in any preceding clause, wherein the prefetch circuitry is arranged to maintain accuracy information for one or more prefetch requests issued by the prefetch circuitry, the accuracy information being indicative of a likelihood that the associated data will in due course be requested by the processing circuitry, and detection of the specified condition for the given prefetch request requires the accuracy information for that given prefetch request to indicate an accuracy above a threshold accuracy level.

9. An apparatus as in Clause 8, further comprising an input interface to receive an indication of use by the processing circuitry of the data stored in the further cache circuitry as a result of the higher level prefetch procedure, wherein the prefetch circuitry is arranged to update the accuracy information for the given prefetch request in dependence on the indication of use received at the input interface.

10. An apparatus as in Clause 8 or Clause 9, wherein the trigger circuitry is arranged, in the presence of one or more inhibiting conditions, to determine that the specified condition is absent for the given prefetch request despite the accuracy information for that given prefetch request indicating an accuracy above a threshold accuracy level.

11. An apparatus as in any preceding clause, wherein the trigger circuitry is arranged to suppress generation of the prefetch trigger signal when one or more conditions are detected in relation to at least one of the cache circuitry and the further cache circuitry.

12. An apparatus as in Clause 11, wherein said one or more conditions comprise at least one of:
    a hit rate in the further cache circuitry exceeding a given hit threshold;
    linefill buffer circuitry used to hold information relating to pending linefill requests issued to retrieve data into the further cache circuitry having an occupancy above a given occupancy threshold;
    the further cache circuitry operating in a mode of operation where prefetching is to be inhibited.

13. An apparatus as in any preceding clause, wherein:
    requests specify virtual addresses and the apparatus has address translation circuitry to convert a specified virtual address into a physical address; and
    the trigger circuitry is arranged, when the prefetch trigger signal is issued, to provide the physical address in association with the prefetch trigger signal, thereby avoiding a need for address translation when the higher level prefetch procedure is performed.

14. An apparatus as in any preceding clause, wherein the request handling circuitry is arranged, when the associated data for the given prefetch request is subsequently evicted from the further cache circuitry without that associated data being accessed in the further cache circuitry by the processing circuitry, to store that associated data in the cache circuitry and to restore status information maintained by the apparatus for that associated data to a state that status information would have had had the prefetch trigger signal not been issued when the given prefetch request was processed.

15. An apparatus comprising:
    further cache circuitry arranged to form a higher level of a multi-level memory hierarchy than cache circuitry at a lower level of the multi-level memory hierarchy, the further cache circuitry providing a cache storage to store data for access by processing circuitry; and
    control circuitry, responsive to a prefetch trigger signal received from trigger circuitry associated with the cache circuitry at the lower level of the multi-level memory hierarchy, to cause a request to be asserted for the further cache circuitry providing an address indication identified by the prefetch trigger signal, the request causing associated data identified by the address indication to be retrieved into the further cache circuitry from the cache circuitry, that associated data having been retrieved into the cache circuitry by prefetching activity performed at the lower level of the multi-level memory hierarchy for the cache circuitry.

16. An apparatus as in Clause 15, wherein the control circuitry is arranged to cause the request to be asserted as a linefill request from the apparatus without performing a lookup in the further cache circuitry.

17. An apparatus as in Clause 15 or Clause 16, wherein the control circuitry is arranged to output indication of use information for receipt by training circuitry associated with the cache circuitry at the lower level of the multi-level memory hierarchy, the indication of use information being indicative of use by the processing circuitry of data stored in the further cache circuitry as a result of the prefetch trigger signal.

18. A system comprising:
the apparatus of any preceding clause, implemented in at least one packaged chip;
at least one system component; and
a board,
wherein the at least one packaged chip and the at least one system component are assembled on the board.
19. A chip-containing product comprising the system of clause 18 assembled on a further board with at least one other product component.
20. A computer-readable medium to store computer-readable code for fabrication of the apparatus of any of clauses 1 to 17.
21. A method of handling prefetching in an apparatus having cache circuitry providing a cache storage to store data for access by processing circuitry, the cache circuitry forming a given level of a multi-level memory hierarchy, and the method comprising:
employing request handling circuitry associated with the cache circuitry to process requests received by the request handling circuitry, each request providing an address indication for associated data and the request handling circuitry determining with reference to the address indication whether the associated data is available in the cache circuitry;
issuing, in response to determining that the associated data is unavailable in the cache circuitry, an onward request to cause the associated data to be retrieved into the cache circuitry from a lower level of the multi-level memory hierarchy than the given level;
employing prefetch circuitry to issue, as one type of request to be handled by the request handling circuitry, prefetch requests;
in response to a given prefetch request, retrieving into the cache circuitry the associated data in anticipation of that associated data being requested by the processing circuitry; and
responsive to a specified condition being detected in respect of the given prefetch request, issuing a prefetch trigger signal for receipt by control circuitry associated with further cache circuitry at a higher level of the multi-level memory hierarchy, to cause a higher level prefetch procedure to be triggered by the control circuitry to retrieve the associated data from the cache circuitry into the further cache circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
cache circuitry providing a cache storage to store data for access by processing circuitry;
request handling circuitry associated with the cache circuitry and arranged to process requests received by the request handling circuitry, each request providing an address indication for requested data and the request handling circuitry being arranged to determine with reference to the address indication whether the requested data is available in the cache circuitry;
wherein the cache circuitry is arranged to form a given level of a multi-level memory hierarchy, and the request handling circuitry is responsive to determining that the requested data is unavailable in the cache circuitry to issue an onward request to cause the requested data to be retrieved into the cache circuitry from a lower level of the multi-level memory hierarchy than the given level;
prefetch circuitry to issue, as one type of request to be handled by the request handling circuitry, prefetch requests, and the request handling circuitry being arranged in response to a given prefetch request to retrieve into the cache circuitry prefetched data in anticipation of that prefetched data being requested by the processing circuitry as the requested data; and
trigger circuitry, responsive to a specified condition being detected with respect to the given prefetch request issued by the prefetch circuitry associated with the given level of the multi-level memory hierarchy, to issue a prefetch trigger signal for receipt by control circuitry associated with further cache circuitry at a higher level of the multi-level memory hierarchy than the given level, to cause a higher level prefetch procedure to be triggered by the control circuitry to retrieve the prefetched data from the cache circuitry into the further cache circuitry.

2. An apparatus as claimed in claim 1, wherein the request handling circuitry is arranged, in response to the given prefetch request, to initiate retrieval of the prefetched data into the cache circuitry prior to the trigger circuitry issuing the prefetch trigger signal.

3. An apparatus as claimed in claim 2, wherein the trigger circuitry is arranged to control timing of issuance of the prefetch trigger signal so that the prefetched data for the given prefetch request will be present in the cache circuitry by the time performance of the higher level prefetch procedure is seeking to retrieve the prefetched data from the cache circuitry into the further cache circuitry.

4. An apparatus as claimed in claim 3, wherein the cache circuitry comprises buffer storage into which data retrieved from the lower level of the multi-level memory hierarchy is buffered prior to being drained from the buffer storage into the cache storage, and the trigger circuitry is arranged to control the timing of issuance of the prefetch trigger signal such that the prefetched data for the given prefetch request will be present in the buffer storage by the time performance of the higher level prefetch procedure is seeking to retrieve the prefetched data from the cache circuitry into the further cache circuitry.

5. An apparatus as claimed in claim 4, wherein:
the buffer storage comprises a plurality of buffer entries, each buffer entry arranged to store an address indication, an indication of a type of request that provided that address indication, and the requested data or the prefetched data when retrieved from the lower level of the multi-level memory hierarchy;
the buffer storage is arranged to allocate a given buffer entry to store the address indication provided by the given prefetch request; and
the trigger circuitry is arranged to issue the prefetch trigger signal in response to the prefetched data being retrieved from the lower level of the multi-level memory hierarchy into the given buffer entry provided the specified condition is determined to be present for the given prefetch request.

6. An apparatus as claimed in claim 4, wherein in response to the higher level prefetch procedure causing the prefetched data for the given prefetch request to be transferred from the buffer storage to the further cache circuitry, the request handling circuitry is arranged to prevent the prefetched data being drained into the cache storage.

7. An apparatus as claimed in claim 1, wherein the trigger circuitry is provided by the request handling circuitry.

8. An apparatus as claimed in claim 1, wherein the prefetch circuitry is arranged to maintain accuracy information for one or more prefetch requests issued by the prefetch circuitry, the accuracy information being indicative of a likelihood that the prefetched data will in due course be requested by the processing circuitry, and detection of the specified condition for the given prefetch request requires the accuracy information for that given prefetch request to indicate an accuracy above a threshold accuracy level.

9. An apparatus as claimed in claim 8, further comprising an input interface to receive an indication of use by the processing circuitry of the data stored in the further cache circuitry as a result of the higher level prefetch procedure, wherein the prefetch circuitry is arranged to update the accuracy information for the given prefetch request in dependence on the indication of use received at the input interface.

10. An apparatus as claimed in claim 8, wherein the trigger circuitry is arranged, in the presence of one or more inhibiting conditions, to determine that the specified condition is absent for the given prefetch request despite the accuracy information for that given prefetch request indicating an accuracy above a threshold accuracy level.

11. An apparatus as claimed in claim 1, wherein the trigger circuitry is arranged to suppress generation of the prefetch trigger signal when one or more conditions are detected in relation to at least one of the cache circuitry and the further cache circuitry.

12. An apparatus as claimed in claim 11, wherein said one or more conditions comprise at least one of:
a hit rate in the further cache circuitry exceeding a given hit threshold;
linefill buffer circuitry used to hold information relating to pending linefill requests issued to retrieve data into the further cache circuitry having an occupancy above a given occupancy threshold;
the further cache circuitry operating in a mode of operation where prefetching is to be inhibited.

13. An apparatus as claimed in claim 1, wherein:
requests specify virtual addresses and the apparatus has address translation circuitry to convert a specified virtual address into a physical address; and
the trigger circuitry is arranged, when the prefetch trigger signal is issued, to provide the physical address in association with the prefetch trigger signal, thereby avoiding a need for address translation when the higher level prefetch procedure is performed.

14. An apparatus as claimed in claim 1, wherein the request handling circuitry is arranged, when the prefetched data for the given prefetch request is subsequently evicted from the further cache circuitry without that prefetched data being accessed in the further cache circuitry by the processing circuitry, to store that prefetched data in the cache circuitry and to restore status information maintained by the apparatus for that prefetched data to a state that status information would have had had the prefetch trigger signal not been issued when the given prefetch request was processed.

15. An apparatus as claimed in claim 1, further comprising:
the further cache circuitry arranged to form a higher level of the multi-level memory hierarchy than the cache circuitry at a lower level of the multi-level memory hierarchy, the further cache circuitry providing the cache storage to store data for access by the processing circuitry; and
the control circuitry, responsive to the prefetch trigger signal received from the trigger circuitry associated with the cache circuitry at the lower level of the multi-level memory hierarchy, to cause the request to be asserted for the further cache circuitry providing an address indication identified by the prefetch trigger signal, the request causing the prefetched data identified by the address indication to be retrieved into the further cache circuitry from the cache circuitry, that prefetched data having been retrieved into the cache circuitry by prefetching activity performed at the lower level of the multi-level memory hierarchy for the cache circuitry.

16. An apparatus as claimed in claim 15, wherein the control circuitry is arranged to output indication of use information for receipt by training circuitry associated with the cache circuitry at the lower level of the multi-level memory hierarchy, the indication of use information being indicative of use by the processing circuitry of data stored in the further cache circuitry as a result of the prefetch trigger signal.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of the apparatus of claim 1.

20. A method of handling prefetching in an apparatus having cache circuitry providing a cache storage to store data for access by processing circuitry, the cache circuitry forming a given level of a multi-level memory hierarchy, and the method comprising:
employing request handling circuitry associated with the cache circuitry to process requests received by the request handling circuitry, each request providing an address indication for requested data and the request handling circuitry determining with reference to the address indication whether the requested data is available in the cache circuitry;

issuing, in response to determining that the requested data is unavailable in the cache circuitry, an onward request to cause the requested data to be retrieved into the cache circuitry from a lower level of the multi-level memory hierarchy than the given level;

employing prefetch circuitry to issue, as one type of request to be handled by the request handling circuitry, prefetch requests;

in response to a given prefetch request, retrieving into the cache circuitry prefetched data in anticipation of that prefetched data being requested by the processing circuitry as requested data; and responsive to a specified condition being detected with respect to the given prefetch request issued by the prefetch circuitry associated with the given level of the multi-level memory hierarchy, issuing a prefetch trigger signal for receipt by control circuitry associated with further cache circuitry at a higher level of the multi-level memory hierarchy than the given level, to cause a higher level prefetch procedure to be triggered by the control circuitry to retrieve the prefetched data from the cache circuitry into the further cache circuitry.

* * * * *